US012444394B2

(12) United States Patent
Koretzky et al.

(10) Patent No.: US 12,444,394 B2
(45) Date of Patent: Oct. 14, 2025

(54) SCALABLE SIMILARITY-BASED GENERATION OF COMPATIBLE MUSIC MIXES

(71) Applicant: Distributed Creation Inc., New York, NY (US)

(72) Inventors: Alejandro Koretzky, Los Angeles, CA (US); Naveen Sasalu Rajashekharappa, Hayward, CA (US); Aswin Rajkumar, Irvine, CA (US)

(73) Assignee: Distributed Creation Inc., New York, NY (US)

( * ) Notice: Subject to any disclaimer, the term of this patent is extended or adjusted under 35 U.S.C. 154(b) by 964 days.

(21) Appl. No.: 17/551,602

(22) Filed: Dec. 15, 2021

(65) Prior Publication Data

US 2023/0186884 A1 Jun. 15, 2023

(51) Int. Cl.

*G10H 1/40* (2006.01)
*G10G 1/00* (2006.01)
*G10H 1/00* (2006.01)

(52) U.S. Cl.

CPC ................. *G10H 1/40* (2013.01); *G10G 1/00* (2013.01); *G10H 1/0066* (2013.01);
(Continued)

(58) Field of Classification Search

CPC .. G10H 1/40; G10H 1/0066; G10H 2210/066; G10H 2220/086; G10H 2220/091; G10H 2250/235; G10G 1/00
See application file for complete search history.

(56) References Cited

U.S. PATENT DOCUMENTS

2007/0131094 A1* 6/2007 Kemp ..................... G06F 16/68
707/E17.101
2009/0019995 A1 1/2009 Miyajima
(Continued)

FOREIGN PATENT DOCUMENTS

EP 3843083 A1 6/2021
JP 2007-183921 A 7/2007
(Continued)

OTHER PUBLICATIONS

Bernardes, Gilberto, et al., "A Multi-Level Tonal Interval Space for Modelling Pitch Relatedness and Musical Consonance", Journal of New Music Research, vol. 45, Issue 4, 2016, pp. 281-294.
(Continued)

*Primary Examiner* — Jianchun Qin
(74) *Attorney, Agent, or Firm* — Invoke

(57) ABSTRACT

Scalable similarity-based generation of compatible music mixes. Music clips are projected in a pitch interval space for computing musical compatibility between the clips as distances or similarities in the pitch interval space. The distance or similarity between clips reflects the degree to which clips are harmonically compatible. The distance or similarity in the pitch interval space between a candidate music clip and a partial mix can be used to determine if the candidate music clip is harmonically compatible with the partial mix. An indexable feature space may be both beats-per-minute (BPM)-agnostic and musical key-agnostic such that harmonic compatibility can be quickly determined among potentially millions of music clips. A graphical user interface-based user application allows users to easily discover combinations of clips from a library that result in a perceptually high-quality mix that is highly consonant and pleasant-sounding and reflects the principles of musical harmony.

17 Claims, 22 Drawing Sheets

(52) U.S. Cl.
CPC . *G10H 2210/066* (2013.01); *G10H 2220/086* (2013.01); *G10H 2220/091* (2013.01); *G10H 2250/235* (2013.01)

(56) References Cited

U.S. PATENT DOCUMENTS

| | | | |
|---|---|---|---|
| 2013/0226957 | A1 | 8/2013 | Ellis et al. |
| 2021/0201863 | A1 | 7/2021 | Bosch Vicente et al. |

FOREIGN PATENT DOCUMENTS

| | | | |
|---|---|---|---|
| JP | 2008-164932 | A | 7/2008 |
| JP | 2010-271398 | A | 12/2010 |
| WO | 2011/103498 | A2 | 8/2011 |
| WO | 2015/154159 | A1 | 10/2015 |
| WO | 2020/218075 | A1 | 10/2020 |

OTHER PUBLICATIONS

Davies, et al., "AutoMashUpper: Automatic Creation of Multi-Song Music Mashups", IEEE/ACM Transactions on Audio, Speech, and Language Processing, vol. 22, No. 12, Dec. 2014, pp. 1726-1737.
Ellis, et al., "Cross-Correlation of Beat-Synchronous Representations for Music Similarity", IEEE International Conference on Speech and Signal Processing (ICASSP 2008), Mar. 31, 2008, pp. 57-60.
International Search Report and Written Opinion, PCT App. No. PCT/IB2023/050649, Jun. 14, 2023, 11 pages.

* cited by examiner

SCALABLE SIMILARITY-BASED GENERATION OF COMPATIBLE MUSIC MIXES

TECHNICAL FIELD

This invention relates generally to the field of computer-generated music, and more specifically to a new and useful computer-implemented system and method for scalable similarity-based generation of compatible music mixes.

BACKGROUND ART

Creation of music mixes encompasses the creation and combining of music tracks. It is a creative endeavor often associated with DJs and Electronic Dance Music (EDM). Recently, music mix creation has been facilitated by online collections of royalty-free sounds in digital format. One example of such a collection is the sound sample library available from SPLICE.COM of Santa Monica, California and New York, New York. Such libraries may contain thousands or even millions of sound samples. The size of such a library presents the technical challenge of retrieving sounds that match criteria in a computationally efficient manner. For the purpose of music mix creation, there is a need for computer-based tools that streamline the search, discovery, and retrieval of musically compatible sounds. This invention provides such a new and useful system and method.

BRIEF DESCRIPTION OF THE DRAWINGS

FIG. 23 shows a computer system with which some variations may be implemented.

DETAILED DESCRIPTION

Figure 1:
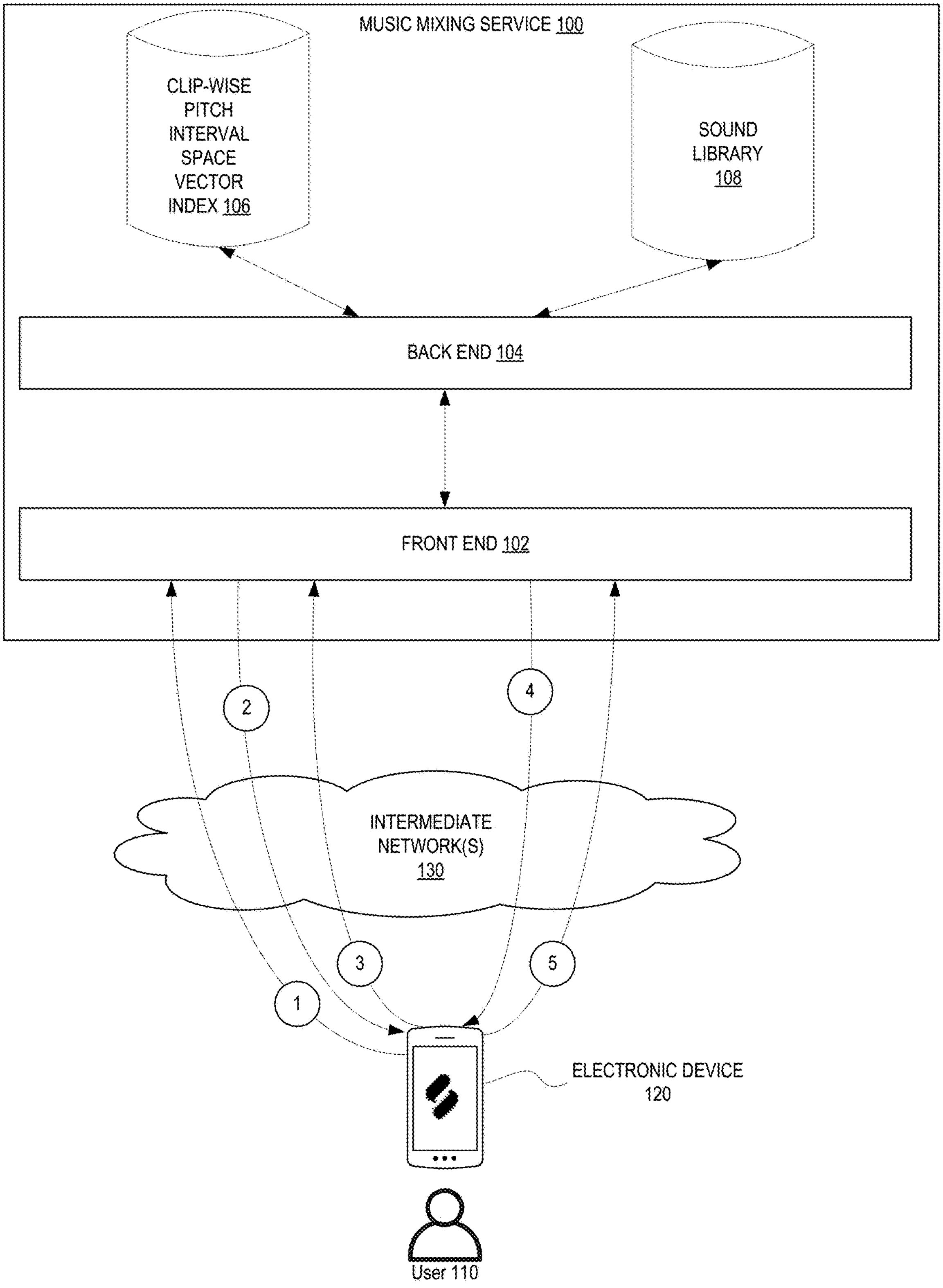
FIG. 1 illustrates a system for similarity-based generation of compatible music mixes according to some variations.

The following description of the preferred embodiments is not intended to limit the disclosure to these preferred embodiments, but rather to enable any person skilled in the art to make and use this disclosure.

The compatibility of music clips (e.g., mixes, stems, or individual tracks) that make up a music mix can be vitally important to the perceptual quality of the mix. A perceptually high-quality mix is a highly consonant and pleasant-sounding mix that reflects, implements, or fulfills the principles of musical harmony. Unfortunately, one may not know beforehand which combination of music clips will produce a perceptually high-quality mix. So, the ability to experiment with different combinations of music clips is useful. Along with the desire for experimentation, there is a desire to produce perceptually high-quality mixes.

In some variations, the computer-implemented techniques disclosed herein assist users in easily discovering combinations of music clips that provide perceptually high-quality musical mixes in the context of music mix creation. The techniques balance the need to experiment with different music clips with the need to efficiently discover perceptually high-quality clips, using a harmonic compatibility approach. The approach includes use of a pitch interval space for computing harmonic compatibility between music clips as distances or similarities between the music clips in the pitch interval space. The distance or similarity between music clips in the pitch interval space reflects the degree to which music clips are harmonically compatible. Given a candidate music clip to add to a partial mix of one or more music clips, the distance or similarity in the pitch interval space between the candidate music clip and the partial mix can be used to determine if the candidate music clip is harmonically compatible with the partial mix. In some variations, an indexable feature space is provided that is both beats-per-minute (BPM)-agnostic and music key-agnostic. That is, harmonic compatibility between clips can be determined even if the clips are at different BPMs or in different keys. Further, an index of music clips can scale to millions of music clips and be used for low latency identification of music clips that are harmonically compatible with a given music clip (e.g., in less than ten milliseconds).

As an example of the problem addressed by the techniques herein in some variations, consider a partial mix that combines music clips from a library of music clips provided by a music mixing computing system (e.g., a cloud-based music mixing computing system). Next, a user of the system may wish to add an additional music clip (e.g., a bassline stem) from the library to the partial mix. The music mixing system may allow users to browse, search for, and access music clips in the library. Such a library can be large (e.g., thousands or millions of music clips). It is very difficult for a user to discover a music clip that is compatible with a partial mix without the help and guidance of the music mixing system. Thus, in creating a complete mix, users may easily become frustrated or overwhelmed attempting to find a compatible music clip. As such, streamlining the process of music mix creation by assisting users in the process of finding a compatible music clip from a large collection of music clips is very important. The appropriate assistance is not only important for the music mixing system operators, which may get more users using the system, more users creating accounts, or more users willing to upgrade accounts, as example benefits, but also to users themselves who will be able to use the music mixing system to streamline their music mix creation process. If the system suggests a music clip that is only rhythmically compatible (e.g., according to onset density) with the partial mix, the resulting mix may be perceived as low-quality. There may be another clip in the library that is more compatible with the partial mix resulting in a perceptually higher-quality mix. The techniques provide for an expanded range of musical attributes when determining music clip compatibility including harmonic attributes. Further, the techniques can be used with more than just harmonic attributes. They can be used with any type of musical attributes, such as rhythmic, spectral, and timbral attributes.

In some variations, the techniques use a harmonic compatibility approach in which the harmonic content of music clips is represented as multi-dimensional vectors in the pitch interval space (or "pitch interval space vectors"). Each pitch interval space vector may have a unique location in the pitch interval space that represents a corresponding unique harmonic configuration. The distances or similarities between those pitch interval space vectors in the pitch interval space can be computed to determine harmonic compatibility between music clips. Further, an element-wise linear combination of pitch interval space vectors (e.g., by averaging or weighted averaging using the vectors' energies) can be used for determining whether a candidate music clip is harmonically compatible with a partial mix. In particular, the distance or similarity in the pitch interval space between (a) the element-wise linear combination of the pitch interval space vectors for the music clips that make up the partial mix and (b) the pitch interval space vector for the candidate music clip reflects the degree to which the candidate music clip is harmonically compatible with the partial mix. Due to their ability to be represented as vectors by a computer, computing an element-wise linear combination of vectors and computing distances or similarities between vectors are relatively efficient computer operations. Thus, the pitch interval space vectors allow the music mixing system to efficiently evaluate large collections of candidate music clips for harmonic compatibility.

The techniques proceed in some variations by receiving a request to suggest a music clip that is musically compatible with a partial mix of previously selected music clips. For example, the previously selected music clip might include a vocal clip and a piano clip. In response to receiving the request, the techniques in some variations linearly combine respective pitch interval space vectors for the previously selected music clips of the partial mix into a pitch interval space vector representing harmonic attributes of the partial mix. The techniques compute distances or similarities in the pitch interval space between the pitch interval space vector for the partial mix and pitch interval space vectors representing harmonic attributes of the candidate music clips. The techniques in some variations respond to the request with a suggestion of a particular candidate music clip that is musically compatible with the partial mix based on the distance in the pitch interval space between the pitch interval space vector representing the partial mix and the pitch interval space vector representing harmonic attributes of the music clip. Returning to the example earlier in this paragraph, the particular music clip suggested might be a bassline music clip that is harmonically compatible with the mix of the vocal and piano clips. If the suggestion is adopted, then a new partial mix is formed. This process may be repeated each time with a new partial music mix that adds or replaces a music clip from the previous partial music mix until a satisfactory music mix is discovered.

In addition to harmonic attributes, the techniques herein in some variations rely on additional musical attributes of a partial mix and candidate music clips such as rhythmic, spectral, or timbral attributes when determining music compatibility between the partial mix and a candidate music clip to ensure that compatibility decisions are not made based only on harmonic qualities of the partial mix and the candidate music clip.

FIG. 1 illustrates a system for similarity-based generation of compatible music mixes according to some variations. A music mix creation process is performed in the system as depicted by directional arrows labeled by numbers within circles. The labeled directional arrows represent data flow steps in the direction of the corresponding arrow from personal electronic device 120 to front end 102 of music mixing service 100 or from front end 102 of music mixing service 100 to personal electronic device 120 via one or more intermediate networks 130. The data may be carried over network(s) 130 using any suitable data communications networking protocol such as, for example, the Internet Protocol (IP), the Transmission Control Protocol (TCP), the HyperText Transfer Protocol (HTTP) (or its cryptographically secured variant HTTPS), etc.

The computing environment of FIG. 1 is presented for purposes of illustrating example embodiments of the present invention. For purposes of discussion, this detailed description presents certain examples with respect to FIG. 1. in which it is assumed that one computer system may communicate with another computer system, such as a user electronic device (e.g., device 120) that communicates with a remote computer system offering at least one service (e.g., service 100). The present invention, however, is not limited to any particular environment or device configuration. In particular, the device 120/service 100 distinction is not necessary to the invention but is used to provide a framework for discussion. Instead, the present invention may be implemented in any type of system architecture or processing environment capable of supporting the methodologies of the present invention presented herein, including single-device configurations. In any such configuration, data and information (e.g., music clips and pitch space vectors) may be exchanged between computing components according to a set of one or more application programming interfaces (APIs) where an API may be used within a single process (e.g., a procedure or function), between processes executing on the same computing device (e.g., an inter-process API), or between processes executing on different computing devices interconnected by a network (e.g., a network API).

As used herein, unless the context clearly indicates otherwise, the term "request" refers to a set of one or more calls, invocations, or messages made, sent, or received via an API and the term "response" refers to a set of one or more calls, invocations, or messages made, sent, or received via an API that is caused by a corresponding request. Further, reference herein to a request or response received from an entity (e.g., a device) does not require that the request or response be received directly from the entity and the request or response may traverse one or more intermediate entities before arriving at a target entity. Likewise, reference to a request or response sent to an entity (e.g., a device) does not require that the request or response be sent directly to the entity and the request or response may traverse one or more intermediate entities on its way from a source entity.

While in some variations such as depicted in FIG. 1, techniques for similarity-based generation of compatible music mixes are implemented in a distributed computing environment where client electronic devices (e.g., personal electronic device 120) interface with server electronic devices of a cloud-based service (e.g., music mixing service 100) via one or more data communications networks (e.g., intermediate network(s) 130), techniques for similarity-based generation of compatible music mixes are performed by a single electronic device or by only a few electronic devices in some variations. For example, techniques for similarity-based generation of compatible music mixes may be implemented, possibly on a smaller scale compared to a cloud-based implementation, by a personal electronic device such as a digital audio workstation (DAW) or a home or work personal computer.

The music mix creation process proceeds at Step 1 where electronic device 120 provides a selection of a stack template. A "stack" refers to a music clip generated according to the techniques disclosed herein and may be composed of a set of multiple layered, synchronized, and musically compatible music clips. Thus, a stack is a music clip that may be composed of other stacks or music clips.

In some variations, each layer of a stack encompasses one or more of the music clips of which the stack is composed. For example, a layer of a stack may encompass a drums music clip, a bass music clip, a guitar music clip, a keys music clip, a strings music clip, a vocals music clip, a chords music clip, a leads music clip, a pads music clip, a brass and woodwinds music clip, a synth music clip, a sound effects clip, etc.

In some variations, the selected stack template may be one of a set of predefined stack templates that are available for selection by user 110 using a music mixing computer program or software application at personal electronic device 120. For example, the set of predefined stack templates may be presented in a graphical user interface at personal electronic device 120 for selection of one by user 110. The music mixing application may be a so-called mobile application that is designed to run on personal electronic device 120 and that can be downloaded and installed using an application marketplace ("app store") such as, for example, the GOOGLE PLAY STORE, the APPLE APP STORE, or the MICROSOFT STORE.

In some variations, personal electronic device 120 is a portable electronic device such as a smartphone, a tablet electronic device, or the like. However, personal electronic device 120 is another type of electronic device in some variations. For example, personal electronic device 120 may be a personal computer or a digital audio workstation (DAW). While in some variations the music mixing application is a mobile application, the music mixing application is a web browser-based application or a thick or thin client application in other variations. No type of electronic device for personal electronic device 120 is required and no type of application for the music mixing application is required. User 110 and personal electronic device 120 are generally representative of what may be possibly many different users and possibly many different personal electronic devices with possibly different types of music mixing applications installed that may be concurrently interfacing with service 100 at any given time.

In some variations, the selection of the stack template received at Step 1 indicates a musical genre, style, category, class, group, family, species, or the like. For example, the selected stack template might be for one of dance, acoustic, random, ambient/drumless, lo-fi and hip hop, trap/rap, etc. In response to front end 102 receiving the selection of the stack template, the selection is provided to back end 104 for further processing. In some variations, back end 104 determines a set of one or more predefined layers that make up the selected stack template. A "layer" refers to a distinct musical part of a stack that a user can configure using techniques disclosed herein. The set of predefined layers may vary among different stack templates that are available for selection. For example, a dance stack template might include a drums layer, a keys layer, a pads layer, a bass, layer, and a synth layer; an acoustic stack template might include a drums layer, a pads layer, a bass layer, a leads layer, and a vocals layer; a random stack template might include a keys layer, a bass layer, a strings layer, and a drums layer; an ambient/drumless stack template might include a pads layer, a leads layer, a bass layer, a vocals layer, and a sound effects layer; a lo-fi and hip hop layer might include a drums layer, a bass layer, a pads layer, and a vocals layer; and a trap/rap layer might include a drums layer, a keys layer, a pads layer, a bass layer, and a synth layer. While in the above examples each stack template is composed of multiple predefined layers, a stack may be composed of just a single predefined layer. Further, using techniques disclosed herein, a user may add additional layers to and remove layers from a selected stack template. Thus, a selected stack template may be viewed as a starting point for the user to begin the music mix creation process so that the user does not need to start from scratch but instead can start from a predetermined stack/mix which the user can then adjust as needed using the techniques disclosed herein.

In some variations, front end 102 provides access to an application programming interface (API) of service 100 to the music mixing application of personal electronic device 120 via an API endpoint of front end 102. The API endpoint may be used by personal electronic device 120 and other electronic devices to make requests over intermediate network(s) 130 of the services and resources of music mixing service 100. Such services and resources may include the ability to receive and respond to requests of Step 1, Step 3, and Step 5 depicted in FIG. 1. When making a request of service 100 via the API endpoint for services or resources such as a request by device 120 as in Step 1, Step 3, and Step 5, the API endpoint may be used with a networking protocol designation (e.g., HTTPS) in a Uniform Resource Indicator (URI). An example of the API endpoint is a Domain Name Service (DNS) name of front end 102.

In some variations, the API of service 100 that is accessible via the API endpoint of front end 102 conforms to a particular communication style. Possible styles that may be used are the Representational State Transfer (REST) style, the Web Sockets style, or the like. The REST style is a stateless communication protocol that uses a request-response communication model. As such, a new network connection (e.g., a Transmission Control Protocol (TCP) connection) may be established for each HTTP or HTTPS request. The Web Sockets style is a stateful communication protocol and allows full duplex communication over a single network connection (e.g., a single TCP connection). Because of the overhead involved in establishing a network connection, a REST communication style is typically slower than a Web Sockets style in terms of the transmission of network messages. However, the stateless nature of REST reduces memory and buffering requirements for transmitted data. Whether the REST style or the Web Socket style is used by front end 102, data received by and send from front end 102 such as data sent between device 120 and front end 102 may be encapsulated or formatted according to a data interchange format such as JavaScriptObject Notation (JSON), extensible Markup Language (XML), or the like.

In some variations, music mixing service 100 itself including front end 102, back end 104, clip-wise pitch interval space vector index 106, and sound library 108 generally adheres to or leverages a "cloud" computing model. A cloud computing model enables ubiquitous, convenient, on-demand network access to a shared pool of configurable resources such as networks, servers, storage applications, and services. A provider of music mixing service 100 may provide its music mixing capabilities to users according to a variety of different cloud computing models including, for example, a Software-as-a-Service ("SaaS") model. With SaaS, the music mixing capabilities are provided to a user using the music mixing service provider's software applications running on infrastructure provided by a cloud infrastructure provider where the music mixing service provider is a customer of the cloud infrastructure provider. The applications may be accessible from various client devices through either a thin client interface such as a web browser, or an application programming interface. The infrastructure includes the hardware resources such as server, storage, and network components and software deployed on the hardware infrastructure that are necessary to support the music mixing capabilities being provided. Typically, under the SaaS model, the music mixing service provider would not manage or control the underlying infrastructure including network, servers, operating systems, storage, or individual application capabilities, except for limited customer-specific application configuration settings.

Front end 102 and back end 104 generally represent a separation of concerns between a presentation layer of music mixing service 100 and a data access/processing layer of music mixing service 100. In some variations, back end 104 implements the application programming interface (API) that is accessible by electronic device 120 via front end 102.

Sound library 108 encompasses a database of music clips. In some variations, a music clip is stored in sound library 108 as a digital audio signal source such as a computer file system file or other data container (e.g., a computer database record) containing digital audio signal data. For example, the digital audio signal data contained by a digital audio signal source may represent a recording of a musical or other auditory performance by a human or represent machine-generated music or sound. The digital audio signal data of a digital audio signal source may be stored uncompressed, compressed in a lossless encoding format, or compressed in a lossy encoding formatted. Non-limiting examples of possible digital audio data formats for the digital audio signal data of a digital audio signal source indicated by their known file extensions include: .AAC, .AIFF, .AU, .DVF, .M4A, .M4P, .MP3, .OGG, .RAW, .WAV, and .WMA.

In some variations, the digital audio signal data of a music clip in sound library 108 represents a loop. A loop is a repeatable section of audio material and may be created using different music creation technologies including, but not limited to, microphones, turntables, digital samplers, looper pedals, synthesizers, sequencers, drum machines, tape machines, delay units, programming using computer music software, etc. A loop often encompasses a rhythmic pattern or a note or a chord sequence or progression that corresponds to musical bars (e.g., one, two, four, or eight bars). Typically, a loop may be repeated indefinitely and yet retain an audible sense of musical continuity. In some variations, the digital audio signal data of a music clip in sound library 108 represents—in the form of a loop—a track, a stem, or a mix. The track, stem, or mix may be mono or stereo.

In some variations, library 108 contains hundreds, thousands, millions, or more music clips. For example, library 108 may be a collection of user, computer, or machine generated or recorded sounds such as, for example, a music sample library provided by a cloud-based music creation and collaboration platform such as, for example, the sound library available from SPLICE.COM of Santa Monica, California and New York, New York.

While it is possible to apply the techniques to library 108 of heterogeneous music clips without distinguishing between different sound content categories of music clips in library 108, it can be beneficial to group music clips into sound content categories. This can be beneficial to increase the efficiency of discovering a compatible music clip in a particular sound content category as a fewer number of candidate music clips in the library (e.g., only those belonging to the sound content category) need to be considered. This can also be beneficial to increase the accuracy of suggesting a compatible music clip as a music clip in the library that does not belong to a desired sound content category will not be suggested as compatible. For example, consider library 108 where it is divided into sound content categories based on musical instrument families. Such sound content categories might include vocals, strings, keyboard, woodwind, brass, and percussion. In this case, a suggestion of a compatible music clip can be made within one of these sound content categories. For such a suggestion, only music clips in library 108 belonging to the sound content category need be considered for the suggestion and music clips not in the particular sound content category do not need to be considered for the suggestion, thereby easing the computational burden to make the suggestion because fewer music clips from library 108 need be considered. Further, if the user desires a suggestion of a compatible music clip in a particular sound content category, then by limiting the suggestion to only a music clip in the sound content category it can be ensured that the suggestion is of a music clip in the desired sound content category In some variations, the different sound content categories into which audio tracks of library 108 are grouped may reflect categorical differences in the statistical distributions of the underlying digital audio signals in the different sound content categories. In this way, a sound content category may correspond to a class or type of statistical distribution. A top-level sound content category may be further subdivided based on instrument, instrument type, genre, mood, or other sound attributes suitable to the requirements of the implementation at hand, to form a hierarchy of sound content categories. As an example, a hierarchy of sound content categories might include the following top-level sound content categories: loops and one-shots. Then, each of those top-level sound content categories might include, in a second level of the hierarchy, a drum category and an instrument category. Each instrument category might include vocals and musical instruments other than drums. Each instrument category can be further subdivided in a third level of the hierarchy into musical instrument families (e.g., into vocals, strings, keyboard, woodwind, and brass sound content categories).

The above is just one non-limiting example of a possible sound content category hierarchy by which library 108 of music clips can be categorized. Other categories are possible, and the techniques are not limited to any category or set of categories or hierarchy of categories. Further, while sound content categories may be heuristically or empirically selected according to the requirements of the implementation at hand including based on the expected or discovered different categories of sounds in library 108, sound content categories may be learned or computed according to a computer-implemented unsupervised clustering algorithm (e.g., an exclusive, overlapping, hierarchical, or probabilistic clustering algorithm).

For example, music clips in library 108 may be grouped (clustered) into different clusters corresponding to sound content categories based on similarities between one or more attributes extracted or detected from the digital audio signal data of the music clips. Such sound attributes on which the music clips may be clustered might include, for example, one or more of: statistical distribution of signal amplitude over time, zero-crossing rate, spectral centroid, the spectral density of the signal data, the spectral bandwidth of the signal data, the spectral flatness of the signal data, or harmonic attributes of the signal data. When clustering, music clips that are more similar with respect to one or more of these sound attributes should be more likely to be clustered together in the same cluster and music clips that are less similar with respect to one or more of these sound attributes should be less likely to be clustered together in the same cluster. It should be noted that, while a music clip in the library can belong to only a single sound content category, it might belong to multiple sound content categories if, for example, an overlapping clustering algorithm is used to identify the sound content categories.

In some variations, music clips in library 108 are indexed in index 106 by the sound content categories to which they belong or to which they are assigned. By doing so, music clips in library 108 that belong to a particular sound content category can be efficiently identified using index 106. In some variations, a search for compatible music clips is constrained by using index 106 to only music clips that belong to a specified or predetermined set of one or more sound content categories. For example, index 106 may be used to search for a compatible music clip where the search space (the set of candidate music clips considered) is constrained to only guitar music clips in library 108.

In some variations, clip-wise pitch interval space vector index 106 indexes music clips in library 108 by clip-wise pitch interval space vectors generated from the music clips. In some variations, a clip-wise pitch interval space vector for a music clip is generated from a set of beat-wise pitch interval space vectors generated for the music clip. A clip-wise pitch interval space vector may represent measures (e.g., two, four, six, eight, ten, twelve, sixteen, etc.) of a music clip at a number of beats per measure (e.g., one, two, four, eight, sixteen, etc.). For example, a clip-wise pitch interval space vector representing a music clip of eight bars with four beats per bar is generated from thirty-two beat-wise pitch interval space vectors. The number of dimensions of a beat-wise pitch interval space vector is the number of pitch classes (e.g., twelve) in some variations. A pitch class is a group of pitches related by octave and enharmonic equivalence. A pitch is a discrete tone with an individual frequency. For example, the number of pitch classes can be twelve where each element of a beat-wise pitch interval space vector corresponds to one of the twelve pitch interval spaces such as, for example {Element 0: Pitch Class C, 1: C #, 2: D, 3: D #, 4: E, 5: F, 6: F #, 7: G, 8: G #, 9: A, 10: A #, 11: B}.

In some variations, the pitch interval space represents human perceptions of pitches, chords, and keys as well as music theory principles as distances. Multi-level pitch configurations are represented in the pitch interval space as twelve-dimensional vectors. In some variations, multi-level pitch configurations are represented in the pitch interval space by pitch interval space vectors T(k), calculated as the Discrete Fourier Transform (DFT) of the pitch class distribution or chroma vector input c(n) as follows:

$$T(k) = w(k)\sum_{n=0}^{N-1} \underline{c}(n)e^{\frac{-j2\pi kn}{N}},\ k \in Z$$

In the above equation:

$$\underline{c}(n) = \frac{c(n)}{\sum_{n=0}^{N-1} c(n)}$$

In some variations, the variable Nis twelve and represents the dimension of the input chroma vector. The variable w(k) represents weights derived from empirical ratings of dyads consonance used to adjust the contribution of each dimension k of the pitch interval space. In some variations, w(k) is the set {3, 8, 11.5, 15, 14.5, 7.5} for audio inputs. In some variations, w(k) is the set {2, 11, 17, 16, 19, 7} for symbolic inputs. The variable k may range from 1 to 6 (or 0 to 5) (and need not range from 1 to 12 (or 0 to 11)), since the remaining coefficients are symmetric.

In some variations, the equation for T(k) uses c(n) which is the input chroma vector c(n) normalized by its L-1 norm to allow the representation and comparison of different hierarchical levels of tonal pitch. From the point of view of Fourier analysis, T(k) is interpreted in some variations as a sequence of six complex numbers, each corresponding to a complex conjugate. The sequence of six complex numbers can be visualized as six corresponding circles. A musical interpretation relates each Discrete Fourier Transform (DFT) component to complementary interval dyads within an octave. The musical interpretation assigned to each coefficient corresponds to the music interval that is furthest from the origin of the plane. Integers around each circle represent 0≤n≤N-1 for N-12, corresponding to the positions in the chroma vector c(n). More information on the theoretical underpinnings of the pitch interval space can be found in the paper by Gilberto Bernardes, Diogo Cocharro, Marcelo Caetano, Carlos Guedes & Matthew E. P. Davies (2016) A multi-level tonal interval space for modelling pitch relatedness and musical consonance, Journal of New Music Research, Volume 45, Issue 4, Pages 281-294.

In some variations, the pitch interval space has musical properties including perceptual proximity. That is, algebraic objective measures capture perceptual features of the pitch sets represented by pitch interval space vectors in the pitch interval space. Specifically, Euclidean and cosine distances among multi-level pitch configurations equate with the human perceptions of pitches, chords, and keys as well as tonal Western music theory principles.

In some variations, the pitch interval space also has the property of transposition invariance. That is, transposing a pitch configuration by semitones in the pitch interval space corresponds to rotations of T(k). Hence, the transposition of any pitch interval space vector results in a vector with the same magnitude or the same distance from the center. This property is an important feature of Western tonal music arising from 12 tone equal-tempered tuning in the sense it accords with Western listeners' perception of interval relations in different regions as analogous. For example, the intervals from C to G in C major and from C #to G #in C #major are perceived as equivalent.

In some variations, the harmonic compatibility between two music clips is measured according to a computationally efficient algebraic distance or similarity metric. The distance or similarity metric is computed using the clip-wise pitch interval space vectors representing the two music clips. In some variations, the distance or similarity metric is computed as the sum of the beat-wise pairwise cosine or Euclidean distances. Here, cosine distance refers to a complement of cosine similarity (e.g., 1-cosine similarity) and not the angular distance (e.g., arccos (cosine similarity)).

For example, consider two clip-wise pitch interval space vectors generated for two music clips each composed of the elements of k number of beat-wise pitch interval space vectors generated for the two music clips. For example, k may be thirty-two corresponding to eight bars of music at four beats per bar. In this case, each clip-wise pitch interval space vector has three hundred and eighty-four (384) elements from the thirty-two twelve element beat-wise pitch interval space vectors. In this case, the harmonic compatibility between the two music clips $MC_1$ and $MC_2$ may be computed as follows:

$$\text{Harmonic Compatibility-1}(MC_1,MC_2)=\Sigma_{k=1}^{32}d(bwV_{1,k},bwV_{2,k})$$

In the above equation, $bwV_{1,k}$ represents the beat-wise pitch interval space vector for the k-th beat of one of the clip-wise pitch interval space vectors and $bwV_{2,k}$ represents the beat-wise pitch interval space vector for the k-th beat of the other of the two clip-wise pitch interval space vectors. In the above equation, the function d( ) represents the algebraic distance metric such the cosine distance or the Euclidean distance applied to two beat-wise pitch interval space vectors. In some variations, each beat-wise pitch interval space vector is normalized (e.g., L2 normalized) when used to compute the algebraic distance metric. In some variations, the greater the value of Harmonic Compatibility−1 ($MC_1$, $MC_2$), the less harmonically compatible are music clips $MC_1$ and $MC_2$ (the greater the distance between the music clips in the pitch interval space). And the lower the value of Harmonic Compatibility−1 ($MC_1$, $MC_2$), the more harmonically compatible are music clips $MC_1$ and $MC_2$ (the shorter the distance between the music clips in the pitch interval space).

In some variations, equivalence between Euclidean and cosine distance metrics is leveraged so that only a single algebraic distance computation is needed to compute the harmonic compatibility between music clips, without requiring the summation of partial distance computations at the beat level. To do this, each beat-wise pitch interval space vector is individually normalized by its L2 norm. Then, a single algebraic distance computation is applied to the clip-wise pitch interval space vectors composed of the L2 normalized beat-wise pitch interval space vectors as follows:

$$\text{Harmonic Compatibility-2}(MC_1,MC_2)=d(cwV_1,cwV_2)$$

Here, $cwV_1$ is the clip-wise pitch interval space vector for music clip $MC_1$ and $cwV_2$ is the clip-wise pitch interval space vector for music clip $MC_2$. Each beat-wise pitch interval space vector of $cwV_1$ and each beat-wise pitch interval space vector of $cwV_2$ is normalized by its respective L2 (Euclidean) norm, making the sum of the beat-wise cosine distances equivalent to the single Euclidean distance computation at the clip level. By doing so, harmonic compatibility between music clips can be determined in a scalable manner using an approximate nearest neighbors algorithm (e.g., scaling to millions of music clips)

In some variations, generating a clip-wise pitch interval space vector for a music clip includes regular short-time interval detection and spectral analysis performed on the digital audio signal data of the music clip. In interval detection, musical beats in the music clip are identified. In some variations, up to a predetermined number of beats in the music clip are identified. For example, the predetermined number may be thirty-two representing eight bars of music at four beats per bar. However, no number of predetermined beats is required.

Various digital audio signal data processing techniques may be used to identify musical beats in a music clip audio signal. For example, a technique may identify musical note onsets in the signal data's energy or spectrum and then analyze the pattern of onsets to detect recurring patterns or quasi-periodic pulse trains. For example, a beat tracking and bar find method may be used.

In some variations, the spectral analysis of the clip-wise pitch interval space vector generation extracts chroma representations from the digital audio signal data of the music clip on the beats identified by the interval detection. In some variations, a chroma representation for a beat is a twelve-element vector ("chroma vector") where each element corresponds to one of the twelve pitch classes of the equal-tempered chromatic scale. The value of an element in the chroma vector for the beat numerically indicates the saliency of the corresponding pitch class at the beat in the signal data. A chroma vector may be computed by applying a filter bank to a time-frequency representation of digital audio signal data. For example, the time-frequency representation may result from either a short-time Fourier transform (STFT) or a constant-Q transform (CQT), with the latter providing a finer frequency resolution in the lower frequencies.

In some variations, the beat-wise pitch interval space vectors that make up the clip-wise pitch interval space vector generated for the music clip are generated from the beat-wise chroma vectors. Specifically, a beat-wise pitch interval vector for a given beat of the music clip can be computed as the L1-normalized Discrete Fourier Transform (DFT) of the beat-wise chroma vector generated for the beat as in the equation for T(k) provided above. This may be done for each beat-wise chroma vector to generate the set of beat-wise pitch interval space vectors that make up the clip-wise pitch interval space vector for the music clip.

In some variations, an indexable feature space that is beats per minute (BPM)-agnostic for determining harmonic compatibility between clips is provided. The indexable feature space uses a flat vector representation of a music clip of shape (1, N) that normalizes the clip's duration in terms of a BPM-agnostic measure. In some variations, the BPM-agnostic measure is a predetermined number of bars and a predetermined number of beats per bar. In some variations, the flat vector representation is a BPM-agnostic clip-wise pitch interval space vector representation of the music clip.

Figure 2:
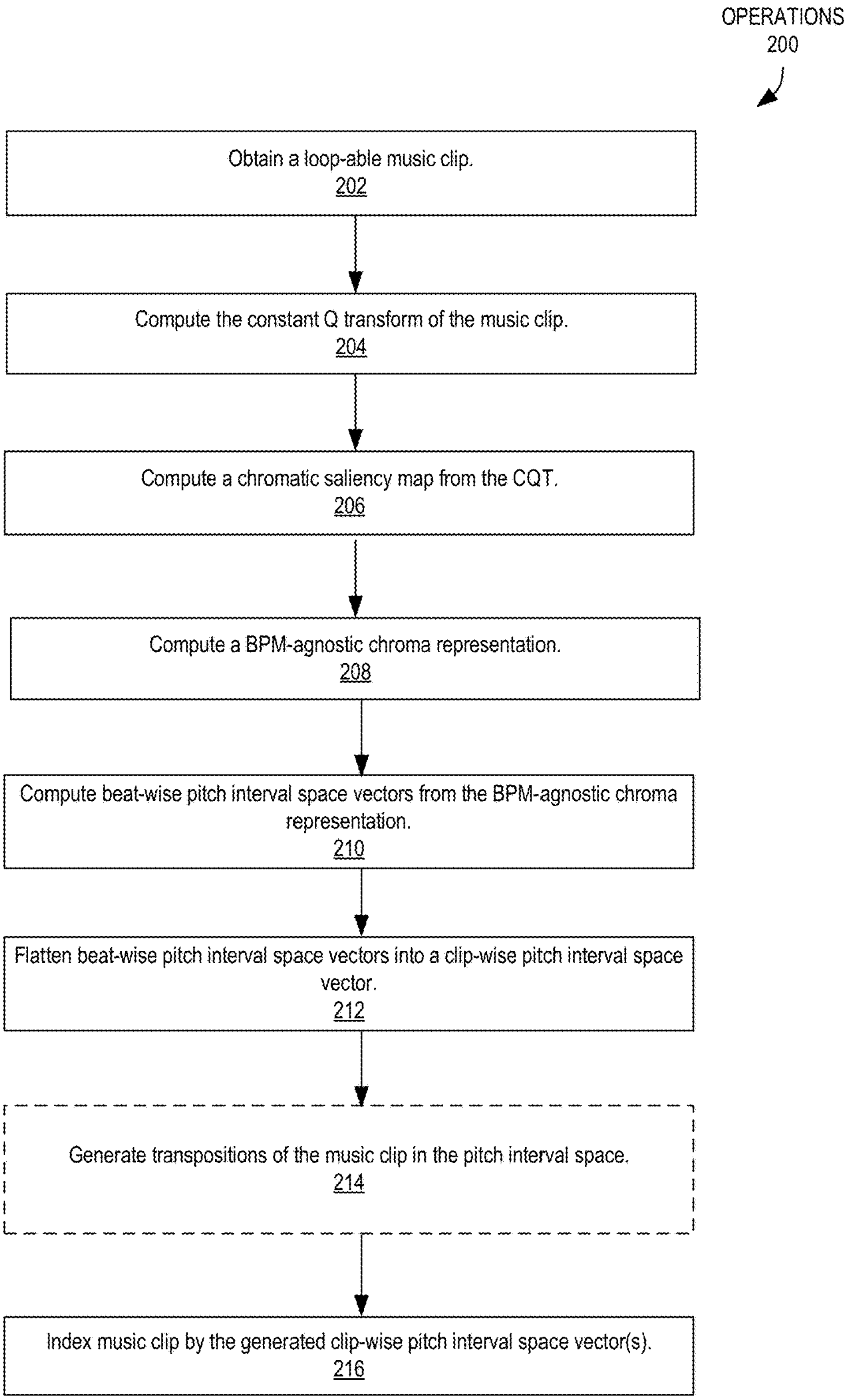
FIG. 2 illustrates a method for generating and indexing a beats-per-minute (BPM)-agnostic clip-wise pitch interval space vector for a music clip, according to some variations.

FIG. 2 illustrates a method for generating a BPM-agnostic clip-wise pitch interval space vector for a music clip, according to some variations. Some or all the operations 200 (or other processes described herein, or variations, or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 200 are performed by back end 104 of music mixing service 100 of the other figures.

At operation 202, a loop-able music clip is obtained. For example, the loop-able music clip can be obtained from sound library 108. The loop-able music clip has a predetermined number of bars of music and predetermined number of beats per bar. For example, the predetermined number of bars may range between two and sixteen bars and the predetermined number of beats per bar may range between two and eight. The loop-able music clip can be any type of pitch-based music clip. For example, the loop-able music clip may correspond to any of the following stack layers or sound content categories: bass, guitar, keys, strings, vocals, chords, leads, pads, brass and woodwinds, synth, sound effects, etc.

At operation 204, the Constant Q transform (CQT) of the music clip is computed using twelve bins per octave. The output of this computation may be a Short-Time Fourier Transform (STFT)-like representation where the resolution in the frequency axis corresponds to that in the music scale (e.g., the resulting frequency bins may be viewed as notes on a piano). The number of frames may be determined by the clip's time duration and the window parameters of the CQT computation akin to a STFT.

Figure 3:
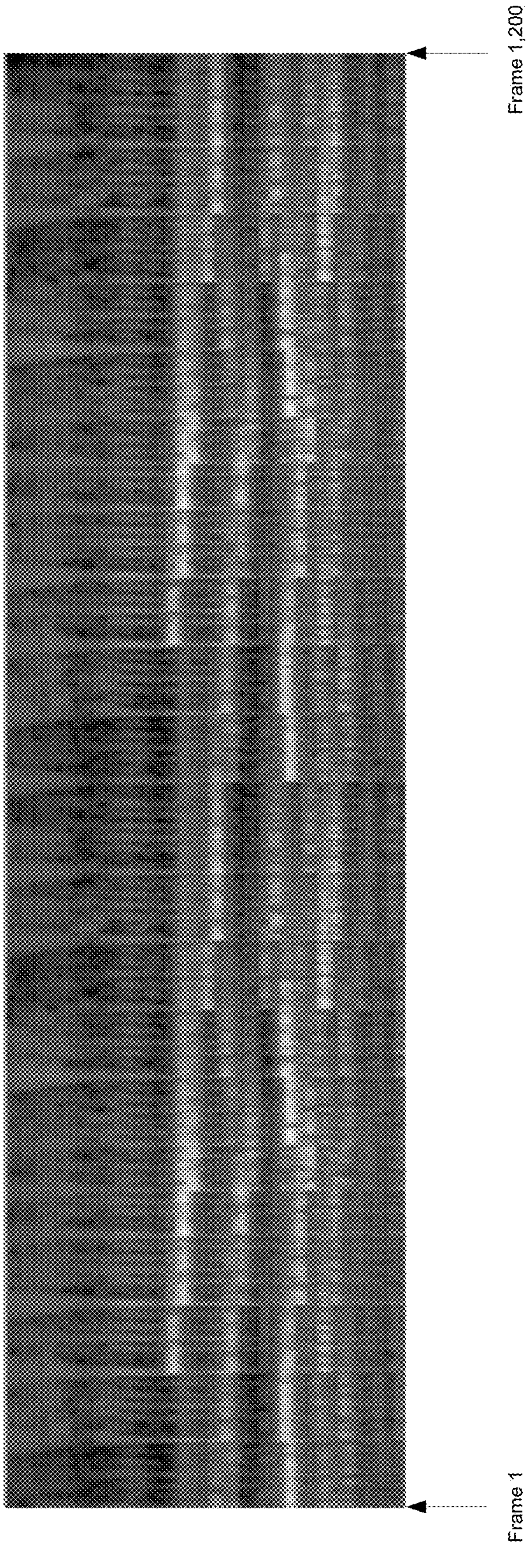
FIG. 3 depicts as a plot a constant Q transform matrix of an example music clip, according to some variations.

FIG. 3 depicts a CQT matrix of an example music clip as a plot. One dimension (x-axis/columns) of the matrix represents frames and the other dimension (y-axis/rows) represents frequency. In this non-limiting example, there are twelve hundred (1,200) frames.

At operation 206, a chromatic saliency map is computed from the CQT. The chromatic saliency map represents the music clip in a way that exposes the distribution of pitch classes in the chromatic musical scale. Stated otherwise, the chromatic saliency map represents the music clip in a way that exposes the contribution or presence of specific notes or intervals in the chromatic music scale. The CQT may span multiple octaves. The computed chromatic saliency map may collapse each octave into a single bin, resulting in a twelve by N matrix where twelve is the number of notes in the chromatic musical scale. The number of frames N may remain the same as in the CQT.

Figure 4:
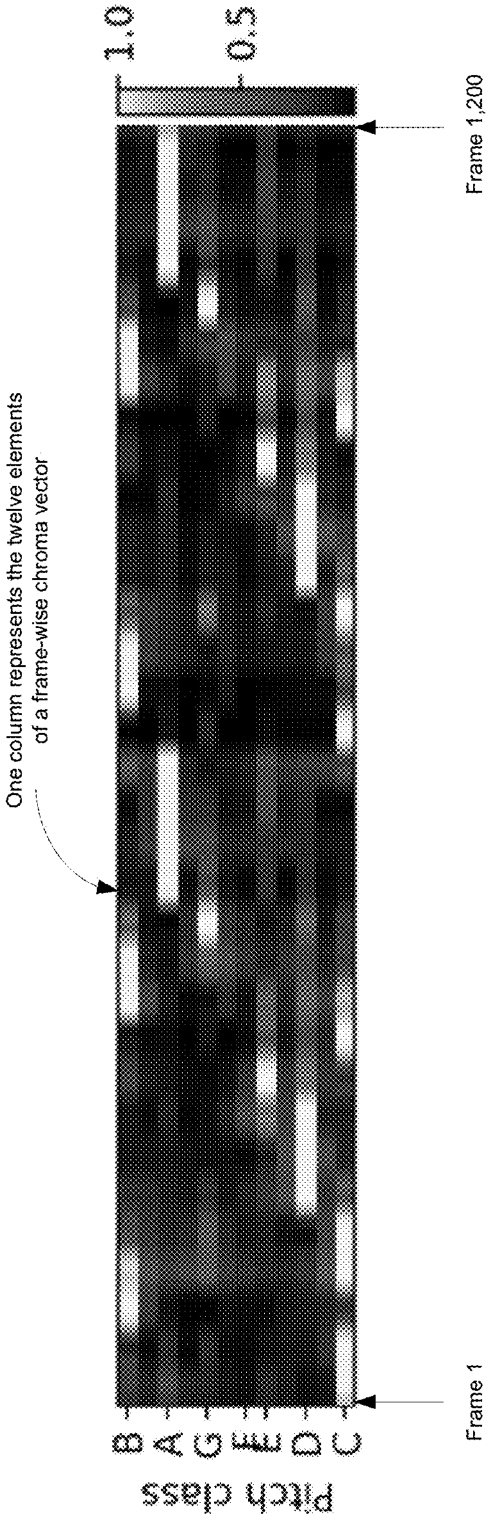
FIG. 4 depicts as a plot a chromatic saliency map generated based on the constant Q transform matrix depicted in FIG. 3, according to some variations.

FIG. 4 depicts a chromatic saliency map for the example music clip depicted in FIG. 3 as a plot. One dimension (x-axis/columns) of the map represents the twelve hundred (1,200) frames and the other dimension (y-axis/rows) of the map represents the twelve (12) pitch classes of the chromatic scale. Chroma values are normalized in the map to range between zero (0.0) and one (1.0).

In some variations as represented by operations 204 and 206, the chromatic saliency map is computed from the CQT according to a deterministic transformation. However, other deterministic or a non-deterministic approach may be used to generate the chromatic saliency map. For example, the chromatic saliency map may be generated based on a machine learning model (e.g., an artificial neural network model) trained to generate chromatic saliency maps from music clips in the time-domain or from intermediate representations thereof (e.g., CQT representations thereof). Thus, operations 204 and 206 should be viewed as just one possible way to generate a chromatic saliency map for the music clip. However, other ways may be used. For example, the chromatic saliency map may be computed based on a perceptually driven heuristic. For example, a heuristic may reflect that, due to masking effects, some pitch classes may not be aurally perceptible and therefore should not be represented in the chromatic saliency map even though the pitch classes quantitatively exhibit high energy. Instead of generating the chromatic saliency map from a CQT, the chromatic saliency map may be generated from a Short-Time Fourier Transform (STFT) representation or other frequency domain representation of the music clip. The chromatic saliency map may also be generated from a time domain representation of the music clip.

In some variations, the chromatic saliency map encompasses a chromagram representation. The chromagram representation encompasses a sequence of twelve dimensional vectors over a time of the music clip. Each vector corresponds to a frame of the chromagram representation and encodes the music clip's short-time energy distribution for the frame relative to the twelve chroma subbands.

At operation 208, a BPM-agnostic chroma representation of the chromatic saliency map is formed. To make the chromatic saliency map BPM-agnostic, the N chroma frames are aggregated (e.g., summed or averaged) into beat-level resolutions. For example, given a music clip that is eight bars long and has a 4/4-time signature, the number of beats of the music clip is thirty-two. Further assume the number of chroma frames N in this example is twelve hundred (1,200). Thus, in this example, thirty-two chunks of approximately thirty-seven and one-half chroma frames are aggregated for each beat resulting in a twelve by thirty-two BPM-agnostic chroma representation matrix that is composed of twelve dimensional chroma vectors, one for each of the thirty-two beats.

Figure 5:
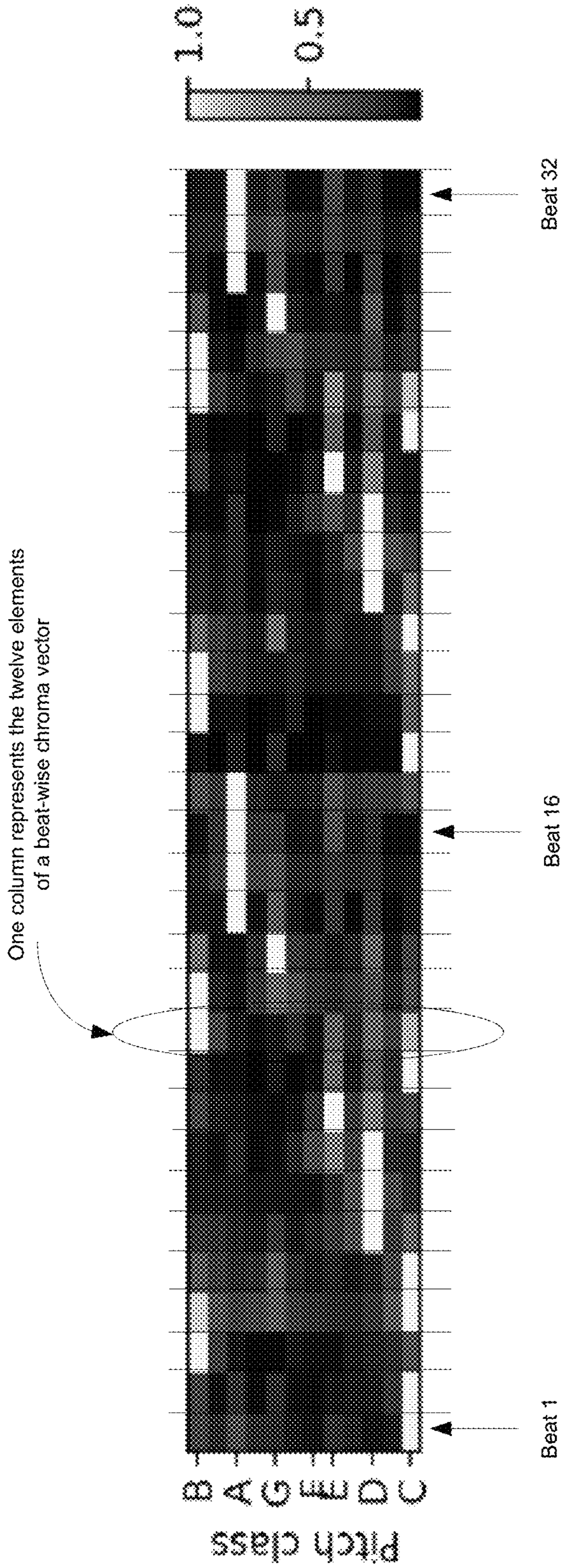
FIG. 5 depicts as a plot a beats-per-minute agnostic chroma representation generated based on the chromatic saliency map depicted in FIG. 4, according to some variations.

FIG. 5 depicts a BPM-agnostic chroma representation matrix generated by aggregating, beat-wise, chroma vectors of the chromatic saliency map matrix depicted in FIG. 4 as a plot. As depicted, the twelve hundred (1,200) chroma frames of the chromatic saliency map for the example music clip have been aggregated beat-wise for thirty-two beats. One-dimension (x-axis/columns) of the matrix represents the thirty-two (32) beats and the other dimension (y-axis/rows) of the matrix represents the twelve pitch classes of the chromatic scale. Chroma values in the matrix are normalized to range between zero (0.0) and one (1.0).

At operation 210, real and imaginary components of a set of beat-wise pitch interval space vectors are computed from the BPM-agnostic chroma representation (e.g., the twelve by thirty-two chroma representation matrix). This involves a Fourier Transform of a real signal. For example, each twelve-element column of the twelve by thirty-two chroma representation matrix (e.g., each chroma vector) may be viewed as a time-domain signal. As a result, the Fourier Transform of the signal results in a complex vector of twelve real values and twelve imaginary values. Because each chroma vector is a real signal, the Fourier Transform is symmetric and therefore only the first half of the coefficients need be retained, resulting in six real and six imaginary values which make up the real and imaginary components of a twelve element beat-wise pitch interval space vector. The result of operation 210 may be two six by M matrices composed of the real and imaginary components of M beat-wise pitch interval space vectors where the M columns of each matrix contains the real or the imaginary components of the M beat-wise pitch interval space vectors. M represents the number of beats. For example, M may be two, four, eight, sixteen, thirty-two, or sixty-four beats, or some other number of beats suitable for the requirements of the particular implementation at hand.

Figure 6:
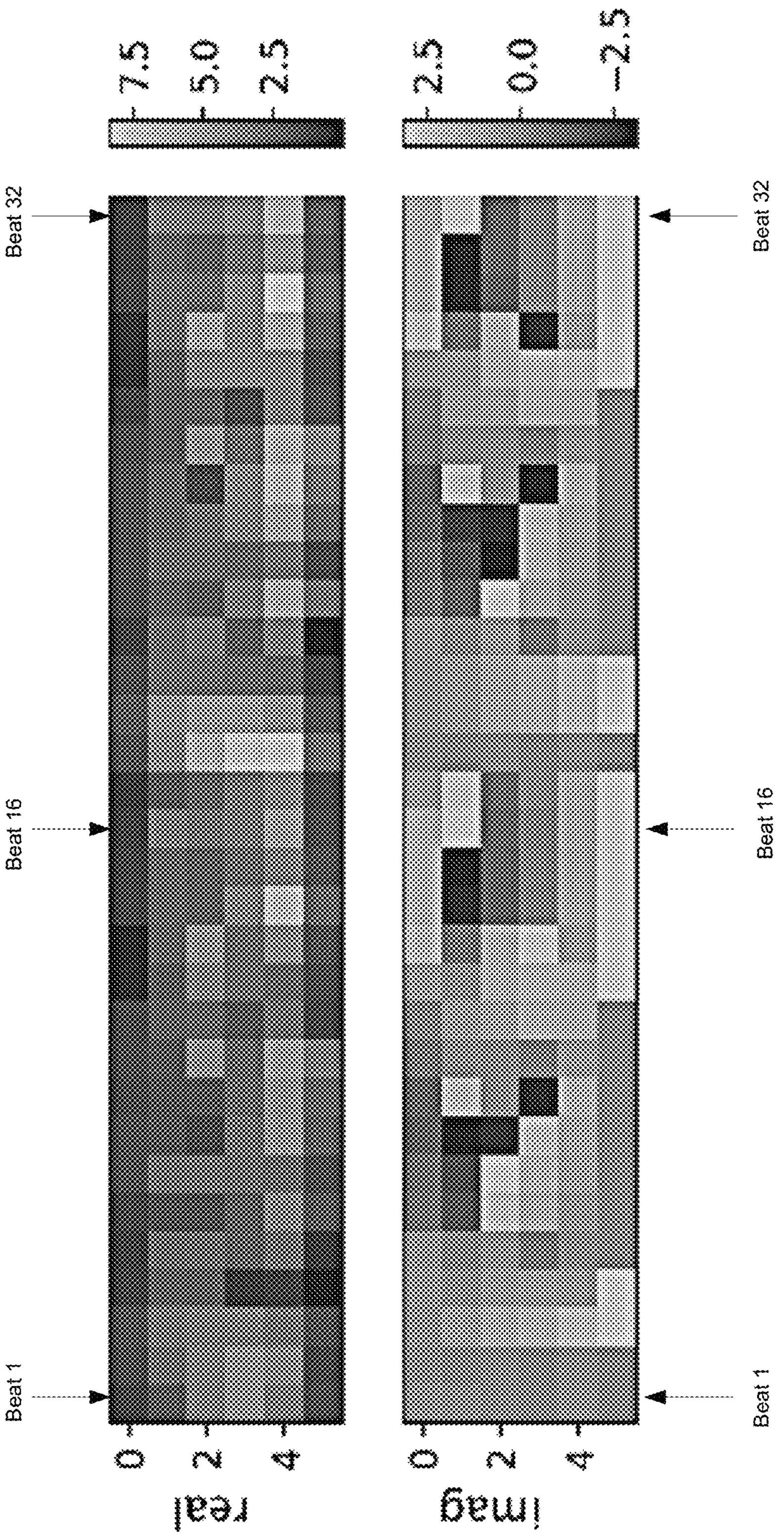
FIG. 6 depicts as plots two matrices that include the real and imaginary components of beat-wise pitch interval space vectors generated from the BPM-agnostic chroma representation matrix of FIG. 5, according to some variations.

FIG. 6 depicts two matrices that include the real and imaginary components of thirty-two beat-wise pitch interval space vectors generated from the BPM-agnostic chroma representation matrix of FIG. 5 as plots. One-dimension (x-axis/columns) of the matrices represents the thirty-two (32) beats and the other dimension (y-axis/rows) represents the six real and six imaginary values that make up the thirty-two beat-wise pitch interval space vectors.

Also at operation 210, the real and imaginary components of each beat-wise pitch interval space vector are concatenated to form a single twelve by M matrix encompassing the M beat-wise pitch interval space vectors.

Figure 7:
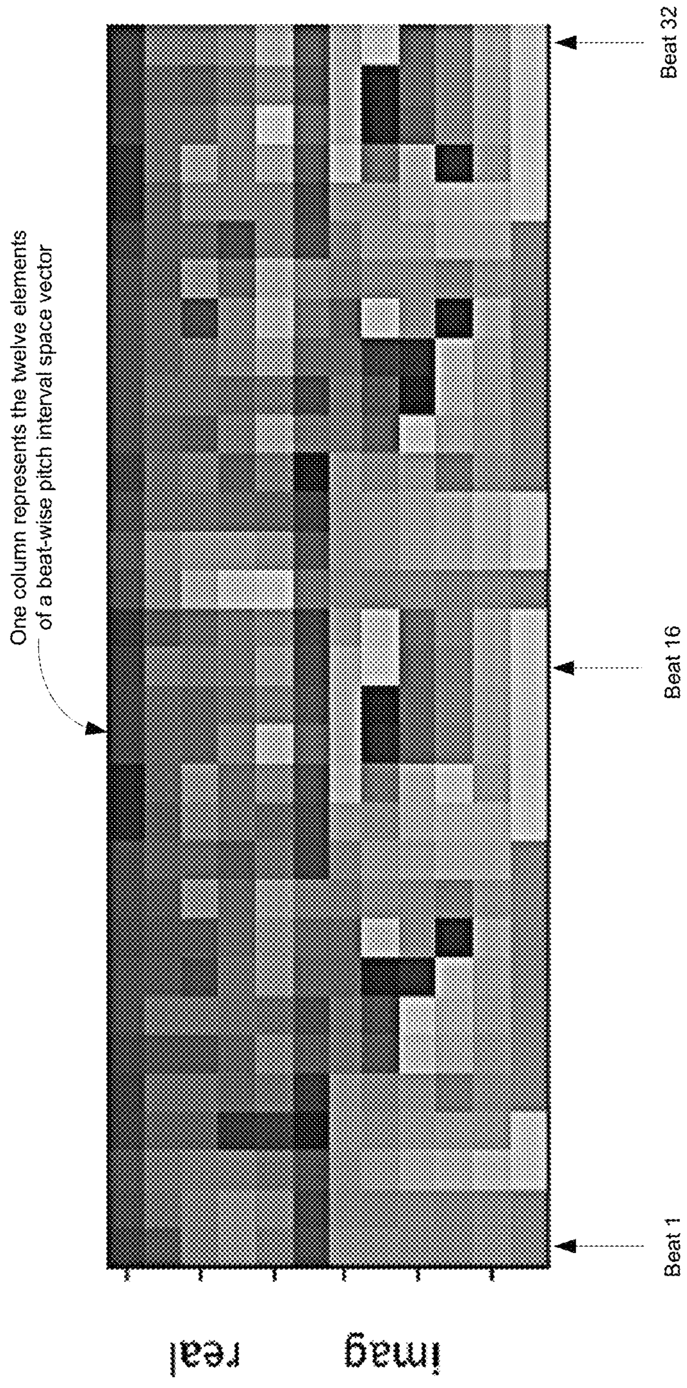
FIG. 7 depicts as a plot a result of concatenating the real and imaginary components of the two matrices of FIG. 6, according to some variations.

FIG. 7 depicts the result of concatenating the real and imaginary components of the two matrices of FIG. 6 to produce a single matrix encompassing thirty-two beat-wise pitch interval space vectors where each column of the matrix contains a beat-wise pitch interval space vector for a respective beat of the example music clip.

At operation 212, the matrix of M beat-wise pitch interval space vectors is flattened into a clip-wise pitch interval space vector of shape (1, (twelve*M)). For example, if M is thirty-two beats, then the clip-wise pitch interval space vector has a dimensionality of (1,384). In some variations, the matrix is flattened column-wise by concatenating the real and imaginary parts of each beat-wise pitch interval space vector into the clip-wise pitch interval space vector.

In some variations, each beat-wise pitch interval space vector of which the clip-wise pitch interval space vector is composed is normalized by its L2 norm (also known as the 2-Norm or Euclidean Norm) before being concatenated together to form the clip-wise pitch interval space vector. This normalization may be performed to leverage the equivalence (proportionality) of Euclidean distance of unit vectors to their cosine distance to solve the problem of identifying in a scalable manner and with low latency harmonically compatible music clips where the two-dimensional feature space representation provided by the matrix of M beat-wise pitch interval space vectors is not readily indexable in an index (e.g., an index support approximate nearest neighbor search).

Figure 8:
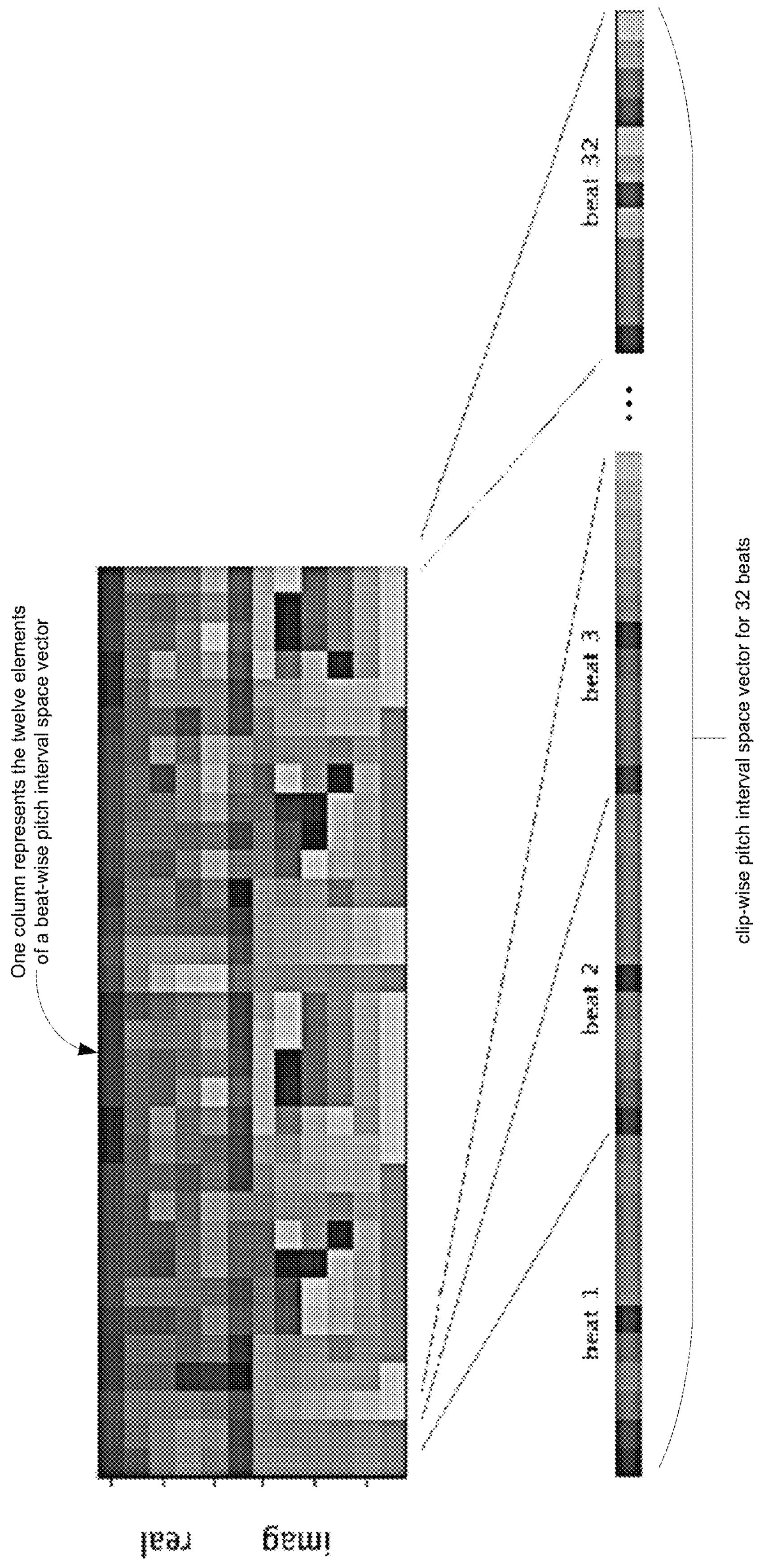
FIG. 8 depicts a flattening of the matrix of FIG. 7 into a clip-wise pitch interval space vector, according to some variations.
Figure 9:
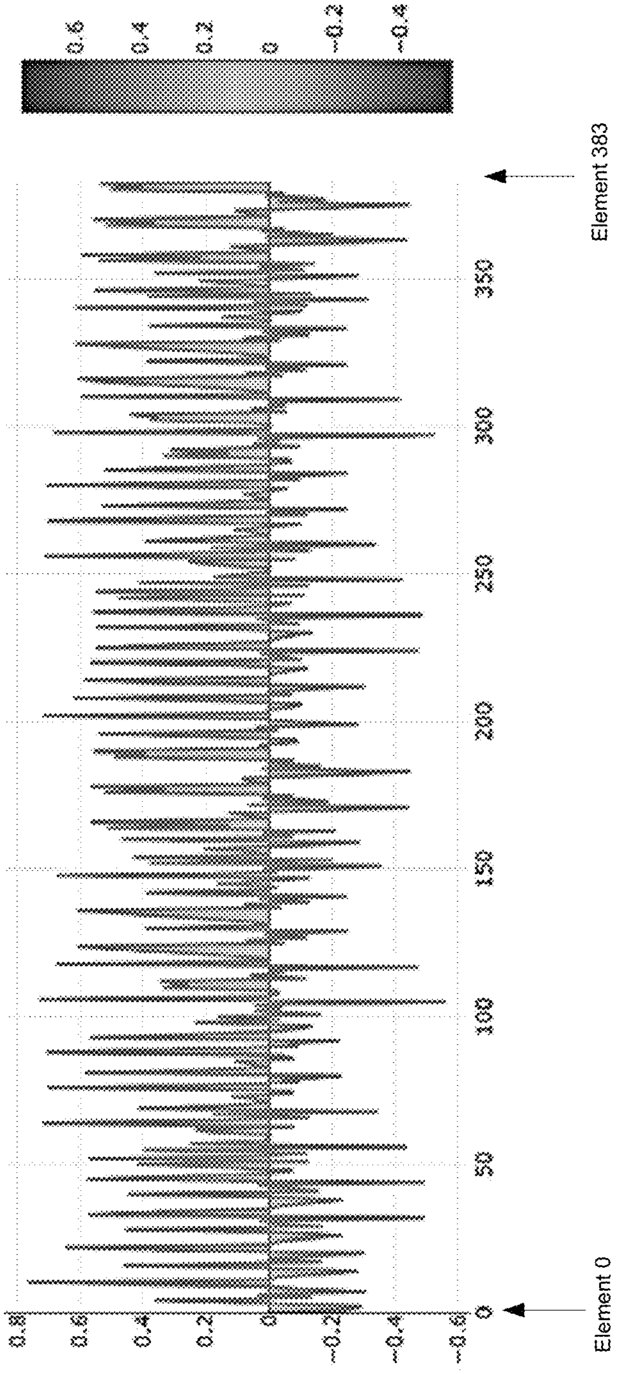
FIG. 9 depicts as a waveform plot the values of the clip-wise pitch interval space vector depicted in FIG. 8, according to some variations.

FIG. 8 depicts as a color-coded plot in a computer graphical user interface the flattening of the matrix of FIG. 7 into a clip-wise pitch interval space vector for the example music clip. Here, the matrix is flattened into a clip-wise pitch interval space vector having three hundred and eighty-four elements encompassing the twelve elements of each of the thirty-two beat-wise pitch interval space vectors. FIG. 9 depicts the values of the three hundred and eighty-four element clip-wise pitch interval space vector as a waveform plot.

The feature space of a music clip is represented by a twelve by M matrix encompassing the M beat-wise pitch interval space vectors. The matrix is flattened in operation 212 to make the feature space indexable and the music clip searchable in a scalable manner. Flattening the two-dimensional matrix of M beat-wise pitch interval space vectors into a one-dimensional clip-wise pitch interval space vector as in operation 212 allows an approximate nearest neighbors search algorithm to be used to quickly identify harmonically compatible music clips and allows an approximate nearest neighbors search to scale to millions of indexed music clips where approximate nearest neighbors search typically supports only one-dimensional vectors. The Harmonic Compatibility−2 ($MC_1$, $MC_2$) equation discussed above represents how harmonic compatibility between two music clips may be efficiently computed using respective clip-wise pitch interval space vectors.

At operation 214, key-agnostic support for the music clip is provided. By being key agnostic, determining harmonic compatibility between clips in different musical keys is possible. Returning to the chroma representation, a circular shift of one element of one column as if it were a time-domain signal is equivalent to transposing the original signal by one semitone. This property that a time-shift in the time-domain is equivalent to a phase rotation in the frequency domain makes it possible to generate transpositions of the music clip directly in the pitch interval space using rotations. For example, a music clip can be indexed such that it can be matched for harmonic compatibility across the twelve keys in the chromatic scale. To do this, the original clip-wise pitch interval space vector generated at operation 212 may be rotated in eleven different ways resulting in a total of twelve clip-wise pitch interval space vectors including the original clip-wise pitch interval space vector. The music clip can then be indexed in index 106 by each of these vectors to allow for matching across different keys. In the case a music clip in one key is matched for harmonic compatibility to another music clip in a different key, then one of the music clips can be pitch-shifted using digital audio signal data processing techniques so that both clips are in the same key. In some variations, support for only a few (e.g., three) semitones above and below the musical key of the original non-pitch shifted music clip is provided. This reduces the number of clip-wise pitch interval space vectors by which a clip is indexed in index 106 and thus the size of index 106. Further, it may prevent noticeable degradation in the perceptual quality resulting from pitch-shifting the original music clip too much (e.g., by more than three semitones up or down on the chromatic scale).

At operation 216, the music clip is indexed by the generated clip-wise pitch interval space vector(s). In some variations, an approximate nearest neighbors-based index supporting approximate nearest neighbors search (e.g., a quantization-based index, a graph-based index, or a tree-based index) is used to index the music clip in index 106 by the generated clip-wise pitch interval space vector(s). For example, a graph-based or a space-partitioning approximate nearest neighbors approach may be used. An approximate nearest neighbors approach can provide an acceptable tradeoff between performance (e.g., quickly identifying a set of one or more music clips that are close in distance in the pitch interval space to a given music clip), scalability (e.g., indexing many music clips), and accuracy (e.g., recall and precision of queries).

In some variations, index 106 is queried by back-end 104 with a "source" clip-wise pitch interval space vector to identify an "answer" set of one or more music clips in library 108 that are indexed by clip-wise pitch interval space vectors that are each close in distance or similarity in the pitch interval space to the source clip-wise pitch interval space vector according to an algebraic distance or similarity measure such as cosine distance or Euclidean distance. If an approximate nearest neighbors search is used, the answer set might not be (but could be) the closest indexed music clips because of the approximate nature of the search. The number of music clips to include in the answer set may be a predetermined number (e.g., a predetermined number of the closest music clips in the pitch interval space). Alternatively, the answer set may include music clips that are all within a predetermined threshold distance or similarity of the source music clip.

In some variations, the query also specifies a set of one or more query constraints that constrain the set of indexed music clips that are included in the answer set. These constraints may be applied when collecting the answer set (e.g., using the approximate nearest neighbors approach) or as a post-search step applied to an initial answer set obtained from the search (e.g., after an initial answer set has been determined using an approximate nearest neighbors search using the source clip-wise pitch interval space vector as the search key). Multiple constraints may be applied conjunctively. That is, if more than one constraint is specified, then a music clip must meet all constraints to be included in the answer set. However, constraints may be applied disjunctively or using Boolean logic (e.g., an expression of the constraints using AND, OR, NOT, or precedence operators).

One constraint already discussed is sound content category. For example, the answer set can be constrained to music clips that all belong to at least one in a set of one or more specified sound content categories. For example, the specified sound content categories can include all the following sound content categories, a subset of these categories, or a superset thereof: drums, bass, guitar, keys, strings, vocals, chords, leads, pads, brass and woodwinds, synth, sound effects, etc.

Another constraint may be beats-per-minute (BPM). This constraint does not affect BPM-agnostic nature of the generated clip-wise pitch interval space vectors. However, it may be desired by the user as part of the mixing process to limit the answer set to music clips that have a certain BPM or within a certain BPM range to avoid introducing noticeable degradation in the perceptual quality of the mix that results from time stretching the music clip in a mix using a time-scale modification algorithm that does not change the pitch of the music clip (e.g., the waveform similarity overlap-add (WSOLA) time scale modification algorithm). In some variations, music clips in library 108 are logically divided by index 106 into a set of non-overlapping BPM buckets and the query specifies one of the buckets by which to constrain the search for compatible music clips. For example, there may be three BPM buckets corresponding to low BPM, mid BPM, and high BPM. For example, the low BPM bucket may contain music clips in library 108 with a BPM below one-hundred BPM, the mid BPM bucket may contain music clips in library 108 with a BPM between one-hundred and one-hundred and fifty BPM, and the high BPM bucket may contain music clips in library 108 with a BPM greater than one-hundred and fifty BPM.

Another possible constraint is musical key. This constraint does not affect the key-agnostic nature of generated clip-wise pitch interval space vectors. However, like with BPM, it may be desired by the user as part of the mixing process to limit the answer set to music clips in a certain key or specified set of keys to avoid introducing noticeable degradation in the perceptual quality of the mix that results from pitch-shifting the music clip in a mix. In some variations, the query specifies a set of one or more of the twelve pitch classes in the chromatic scale by which to constrain the answer set for compatible music clips.

Another possible constraint is chord progression or scale degree progression over a number of bars. For example, it may be desired by the user as part of the mixing process to limit the answer set to music clips that follow a specified chord progression (e.g., specified as a sequence of note names and corresponding bars) or specified scale degree progression (e.g., specified as a sequence of scale degrees and corresponding bars). For example, a chord progression over four bars of music might be specified as Bm for the first bar, D for the second bar, Em for the third bar, G followed by A for the fourth bar. Instead of a specified chord progression, a scale degree progression may be specified. For example, a scale degree note progression over four bars of music might be the first degree (tonic) for the first bar of music, the third degree (mediant) for the second bar of music, the fourth degree (subdominant) for the third bar of music, and the sixth degree (submediant) following by the seventh degree (leading note) for the fourth bar of music. Chord progressions and scale degree progressions of music clips in library 108 may be identified using digital audio signal data processing techniques. In some variations, a music clip satisfies a chord progression or scale degree progression if it contains according to a digital audio signal data processing technique the specified chord progression or the specified scale degree progression.

Returning now to FIG. 1 at Step 2, where service 100 returns the selected stack template prepopulated with a set of one or more music clips selected from library 108. The set of one or more music clips selected by service 100 for inclusion in the stack template may be subject to the genre/style constraints of the selected stack template. For example, if the selected stack template is for the "dance" genre/style, then all the music clips in the set selected for inclusion by service 100 in the stack template may belong to a "dance" sound content category or may otherwise be indexed, tagged, or categorized by service 100 as "dance" music clips.

In some variations, for purposes of determining harmonic compatibility between music clips, drum music clips or other unpitched music clips in library 108 are not considered as candidates. This is because drums and other percussion instruments that are played by striking, shaking, or scraping (e.g., snare drum, bass drum, cymbals, tambourine, triangle, etc.) are usually considered unpitched percussion instruments that produce a weak fundamental frequency. However, some percussion instruments like timpani and pitched toms can have pitch qualities. Thus, there may be no clear delineation between pitch and unpitched music clips in library 108. Digital audio signal data processing techniques may be applied to music clips in library 108 to determine which music clips are sufficiently pitched (e.g., have a detectable fundamental frequency) and which music clips are unpitched (e.g., have a weak fundamental frequency). Pitched and unpitched determinations of music clips in library 108 can be made by users either as an alternative to automatic determination or in conjunction with automatic determination (e.g., by confirming an initial automatic determination).

In some variations, instead of selecting a template to start the stack creation process, the user can select a single "seed" music clip to start the stack creation process. For example, the user may select the seed music clip from library 108, for example, by browsing or searching library 108. Alternatively, the user may record a music clip. For example, the user may use electronic device 120 to record two, four, eight, or more bars of music. For example, the user may sing an 8-bar melody or play an instrument for 8-bars that is captured as a music clip at electronic device 120 via a microphone of or operatively coupled to device 120. In some variations, a clip-wise pitch interval space vector for a recorded music clip is computed at electronic device 120 using techniques disclosed herein. Alternatively, the recorded music clip may be uploaded to service 100 for computation of the clip-wise pitch interval space vector by service 100. Service 100 can then return the computed clip-wise pitch interval space vector to device 120 for use at device 120.

A music clip recorded at device 120 can also be added to an existing stack that is in the process of being created. For example, the user may start the stack creation process by selecting a stack template of one or more music clips. The user may then add a recorded music clip to the current stack. For example, the stack template may start the stack with a keys music clip, a drums music clip, and a guitar music clip. Then, the user may use device 120 to record a vocal melody that the user harmonizes with the current stack. The user may then add the recorded music clip to the current stack to form a new stack that includes the keys music clip, the drums music clip, the guitar music clip, and the recorded vocal music clip. Note that the recorded vocal music clip may be included in the stack by the user without regard to the similarity or distance in the pitch interval space between the recorded vocal track and the other pitch-based music clips of the stack. However, subsequent music clips selected from library 108 to add to the stack or that replace a music clip in the stack may be selected based on the music clip's harmonic compatibility with the recorded vocal music clip according to similarity or distance in the pitch interval space. For example, after adding the recorded vocal music clip to the stack, the user may select to replace the keys music clip provided by the stack template with a different harmonically compatible keys music clip. The selection of the new keys music clip may be based on its harmonic compatibility with the remaining pitch-based music clips in the stack including the guitar music clip and the recorded vocal music clip.

Similar to starting a stack with a user recorded music clip or adding a user recorded music clip to a stack, a stack may be started with a music clip licensed by a recording artist, or a music clip licensed by a recording artist may be added to an existing stack. For example, consider a music mixing competition where contestants use the stacks application disclosed herein where a winner is selected based on the mix judged to be best sounding and where the mix must include at least a music clip provided/licensed by a recording artist sponsoring or supporting the competition. In this example, each contestant might start the competition with a stack that includes a licensed music clip (e.g., a vocal melody sung by the recording artist) as the seed music clip.

Thus, the stack creation process can start in ways other than by selecting a template such as by selecting or recording a seed music clip.

At Step 3, a request for a compatible music clip is received from electronic device 120. For example, assume the stack template returned at Step 2 contains a single "Vocals" music clip or that the seed music clip that is recorded, selected, or uploaded is a "Vocals" music clip. Then, at Step 3, a request for a compatible "Keys" music clip is received. In response to receiving this request for a compatible "Keys" music clip, service 100 may use the clip-wise pitch interval space vector for the "Vocals" music clip in a query into index 106 to determine a compatible (e.g., the most compatible) "Keys" music clip. For example, the determination may be made based on an approximate nearest neighbor search using the clip-wise pitch interval space vector for the "Vocals" music clip in the query. At Step 4, the compatible music clip is returned to the electronic device 120 as a response to the request at Step 3. For example, the most compatible "Keys" music clip may be returned to electronic device 120 to include with the "Vocals" music clip in the current stack at electronic device 120.

Step 3 and Step 4 may be repeated in an iterative fashion until user 110 has decided on a final stack. For example, after the request for a compatible "Keys" music clip, another request for a compatible music clip may be received from electronic device 120 at Step 3. This request may seek a "Leads" music clip that is compatible with current harmonically compatible partial mix ("partial mix") consisting of the compatible "Vocals" music clip and the compatible "Keys" music clip. Since the current partial mix contains more than one music clip, the individual clip-wise pitch interval space vectors for the constituent music clips may be linearly combined (e.g., by simple linear addition) to form a "partial mix-wise" pitch interval space vector that represents the current partial mix. In some variations, an initial partial mix-wise pitch interval space vector formed based on a linear combination of the constituent clip-wise pitch interval space vectors is normalized at the beat level by L2-normalization to form a final partial mix-wise pitch interval space vector. Then, service 100 may use the partial mix-wise pitch interval space vector in a query into index 106 to determine a compatible "Leads" music clip. For example, the determination may be made based on an approximate nearest neighbor search using the partial mix-wise pitch interval space vector for the compatible "Vocals" and "Keys" music clips in the query. At Step 4, the compatible music clip is returned to the electronic device 120 as a response to the request at Step 3. For example, the most compatible "Leads" music clip to the current partial mix consisting of the "Vocals" music clip and the "Keys" music clip may be returned to electronic device 120 to form a new partial mix consisting of the compatible "Vocals" music clip, the compatible "Keys" music clip, and the compatible "Leads" music clip.

Next, user 110 may wish to add a drum music clip to the current stack. Accordingly, another request for a compatible music clip may be received from electronic device 120 at Step 3. This request may seek a "Drums" music clip that is compatible with the current stack consisting of the "Vocals" music clip, the "Keys" music clip, and the "Leads" music clip. However, because "Drums" music clips may be considered unpitched music clips, a compatible "Drums" music clip may be selected by service 100 using an approach other than the harmonic compatibility approach disclosed herein. For example, service 100 may randomly select a compatible "Drums" music clip from library 108 subject to the genre/style constraints (e.g., of the stack template selected at Step 1) or other user-specified or user-configured constraints (e.g., BPMs). While unpitched music clips may be randomly selected subject to constraints, unpitched music clips may be selected otherwise subject to constraints. For example, a compatible unpitched music clip may be selected subject to constraints based on the compatibility of detected onset patterns in the unpitched music clip and the music clips that make up the current stack.

Next, after adding a "Drums" music clip to the current stack, user 110 may wish to add a compatible "Bass" music clip. Accordingly, yet another request for a compatible music clip may be received by service 100 at Step 3. This request may seek a compatible "Bass" music clip that is compatible with current partial mix consisting of the compatible "Vocals" music clip, the compatible "Keys" music clip, and the compatible "Leads" music clips (recall that "Drums" music clips and other unpitched music clips may be excluded from the partial mix for the purpose of determining harmonic compatibility.) Service 100 may form a partial mix-wise pitch interval space vector by linearly combining the clip-wise pitch interval space vectors for the compatible "Vocals" music clip, the compatible "Keys" music clip, and the compatible "Leads" music clip that make up the current partial mix, followed by L2-normalization of the partial mix-wise pitch interval space vector at the beat level. Then, service 100 may use the partial mix-wise pitch interval space vector in a query into index 106 to determine a compatible "Bass" music clip. For example, the determination may be made based on an approximate nearest neighbor search using the partial mix-wise pitch interval space vector in the query. At Step 4, the compatible music clip is returned to the electronic device 120 as a response to the request at Step 3. For example, the most compatible "Bass" music clip to the current partial mix consisting of the compatible "Vocals" music clip, the compatible "Keys" music clip, and the compatible "Leads" music clip may be returned to electronic device 120 to form a new partial mix consisting of the compatible "Vocals" music clip, the compatible "Keys" music clip, the compatible "Leads" music clip, and the compatible "Bass" music clip and a new current stack consisting of the new partial music mix and the "Drums" music clip.

At Step 5, a request may be received by service 100 from electronic device 120 to share the current stack as a complete mix. For example, the current stack may be rendered as a music clip at electronic device 120 or at service 100 for inclusion in library 108, to be stored as a digital audio signal data source at electronic device 120, to be uploaded or otherwise shared with an online social media platform (e.g., the TIKTOK social networking service owned by BYTEDANCE of Beijing, China), to send as a file attachment to an electronic mail (email) message or text (SMS) message, to upload to a cloud-based data storage service or centrally-hosted network file system, or to export in a data format that can be imported into digital audio workstation (DAW) software for further processing.

FIG. 10, FIG. 11, FIG. 12, FIG. 13, FIG. 14, FIG. 15, FIG. 16, FIG. 17. FIG. 18, FIG. 19, FIG. 20, FIG. 21, FIG. 22 depict various states of a graphical user interface of a stack-based music mixing application, according to some variations. The techniques described herein for determining harmonic compatibility between pitch-based music clips may be used to support the stack-based music mixing application. It should be noted that while the following describes a user electronic device as performing certain operations and music mixing service 100 performing other operations, there is no requirement that the distribution of operations performed be exactly as described. For example, some or all the operations described as performed by service 100 may instead be performed by the user electronic device. Further, while the stacks-based music mixing application is described as a mobile application for a mobile computing device, the stacks-based music mixing application may take other forms and execute on other types of computing devices. For example, the stacks-based music mixing application may be included in digital audio workstation software that executes on a workstation computer or a laptop computer.

Further, variations of the stacks-based music mixing application are possible. For example, in one variation, a user may select a set of one or more eight-bar music clips in a digital audio workstation application executing at the user's electronic device. A plugin or an extension to the digital audio workstation application may interface with service 100 over network(s) 130 to retrieve a music clip or a set of music clips in library 108 that is/are harmonically compatible with the selected set of music clips. In this case, the selected set of music clips may or may not be in library 108 or indexed by index 106. The digital audio workstation software or the plugin or extension thereto may generate clip-wise pitch interval space vectors for the selected set of music clips using the techniques disclosed herein and send the generated clip-wise pitch interval space vectors to service 100 over network(s) 130 for use by service 100 to search for harmonically compatible music clips using techniques disclosed herein.

Figure 10:
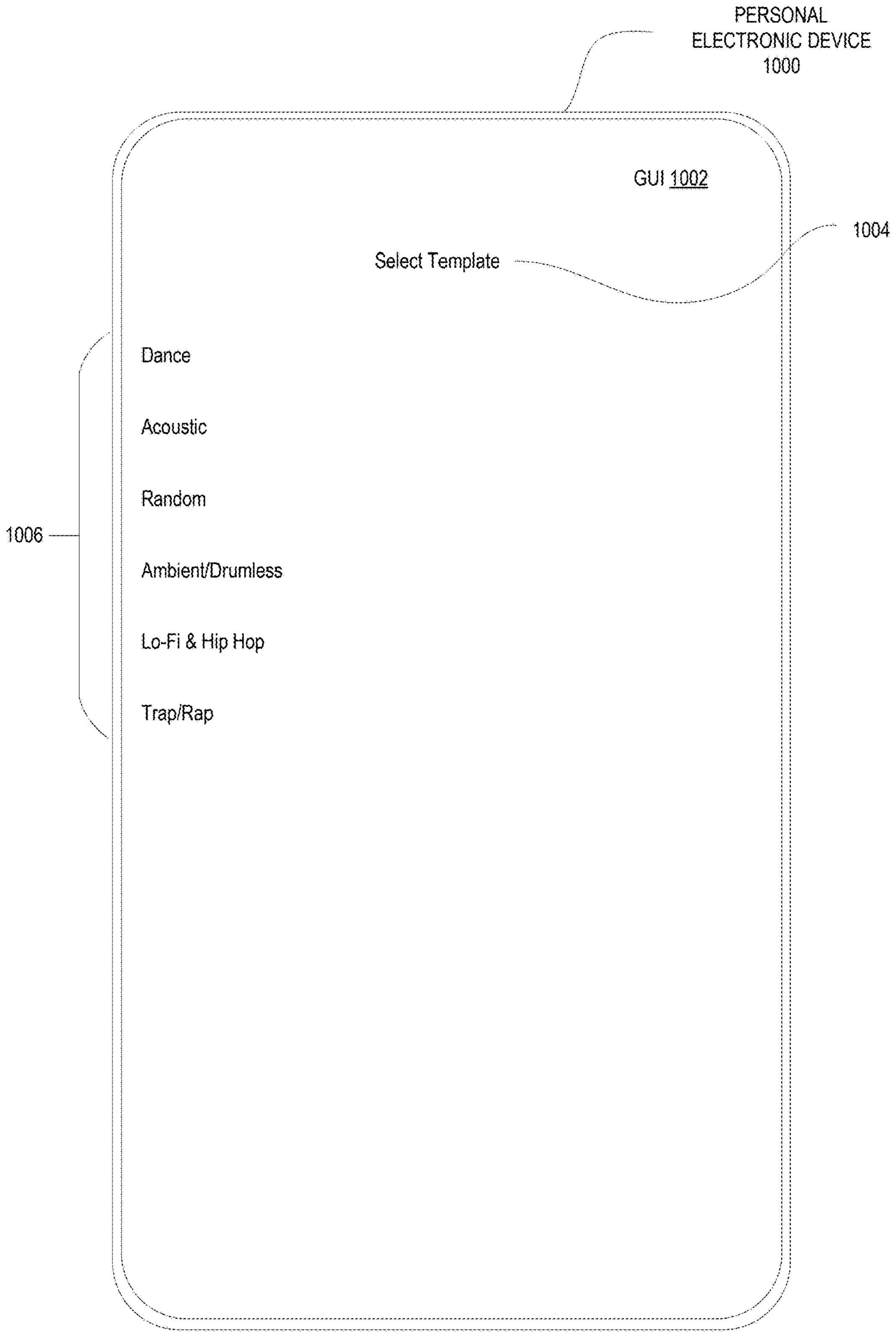
FIG. 10, FIG. 11, FIG. 12, FIG. 13, FIG. 14, FIG. 15, FIG. 16, FIG. 17.

FIG. 10 depicts personal electronic device 1000 (e.g., device 120 of FIG. 1) with graphical user interface (GUI) 1002. GUI 1002 presents options 1006 for selecting a stack template as indicated by text banner 1004. The set of options 1006 correspond to different musical genres/styles. A user may select one of them to begin a mix creation process. As mentioned above, the stacks-based mixing application may support other ways to begin the mix creation process, other than by selecting a stack template. For example, GUI 1002 could offer graphical user interface controls for selecting a seed music clip from library 108 (e.g., by searching or browsing library 108), uploading a seed music clip, or recording a seed music clip via microphone capability of device 1000.

Figure 11:
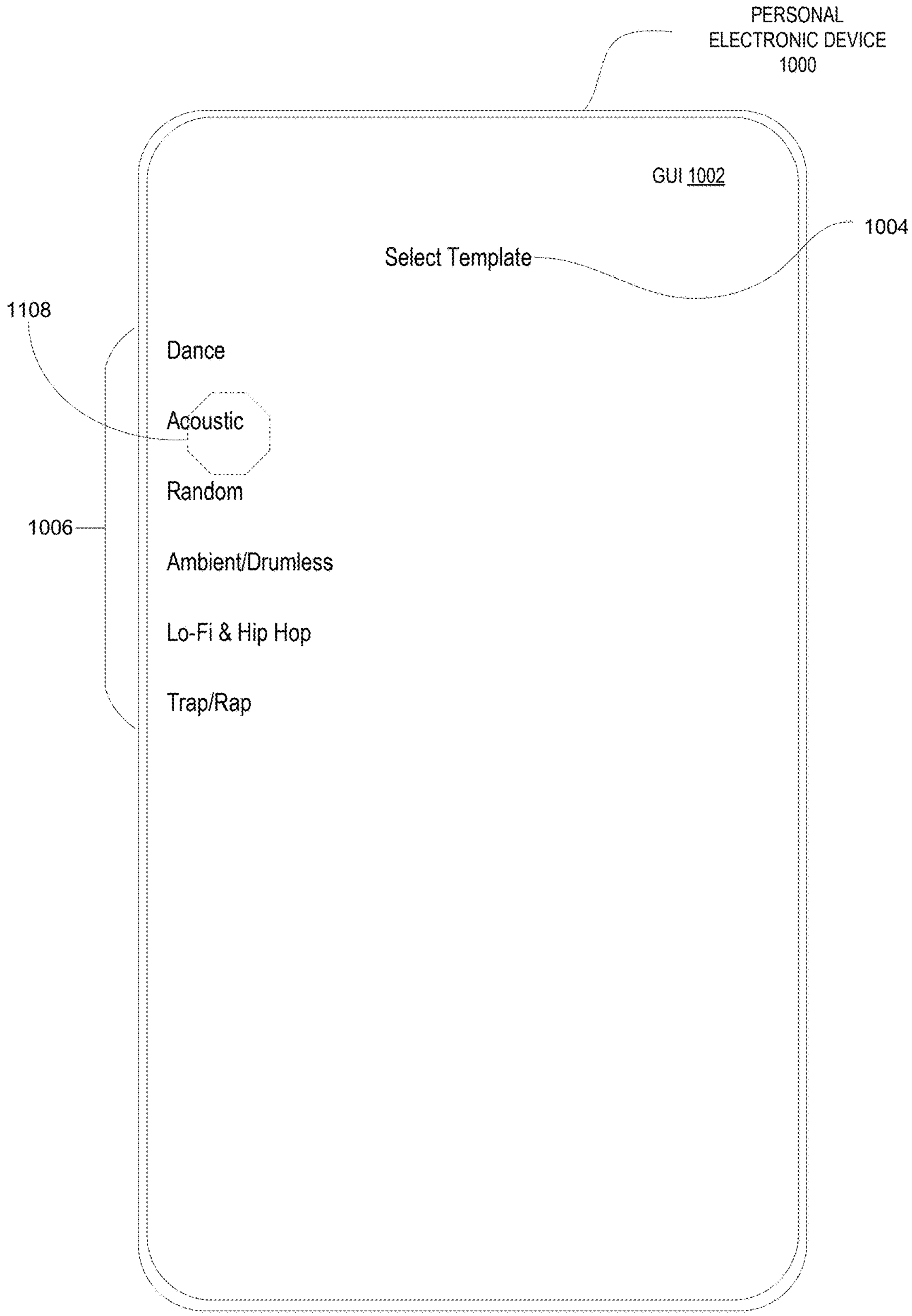

FIG. 11 depicts personal electronic device 1000 with graphical user interface (GUI) 1002. Here, the user has selected 1108 the "Acoustic" stack template option (e.g., by a touch gesture directed to a touch sensitive surface of device 1000.)

Figure 12:
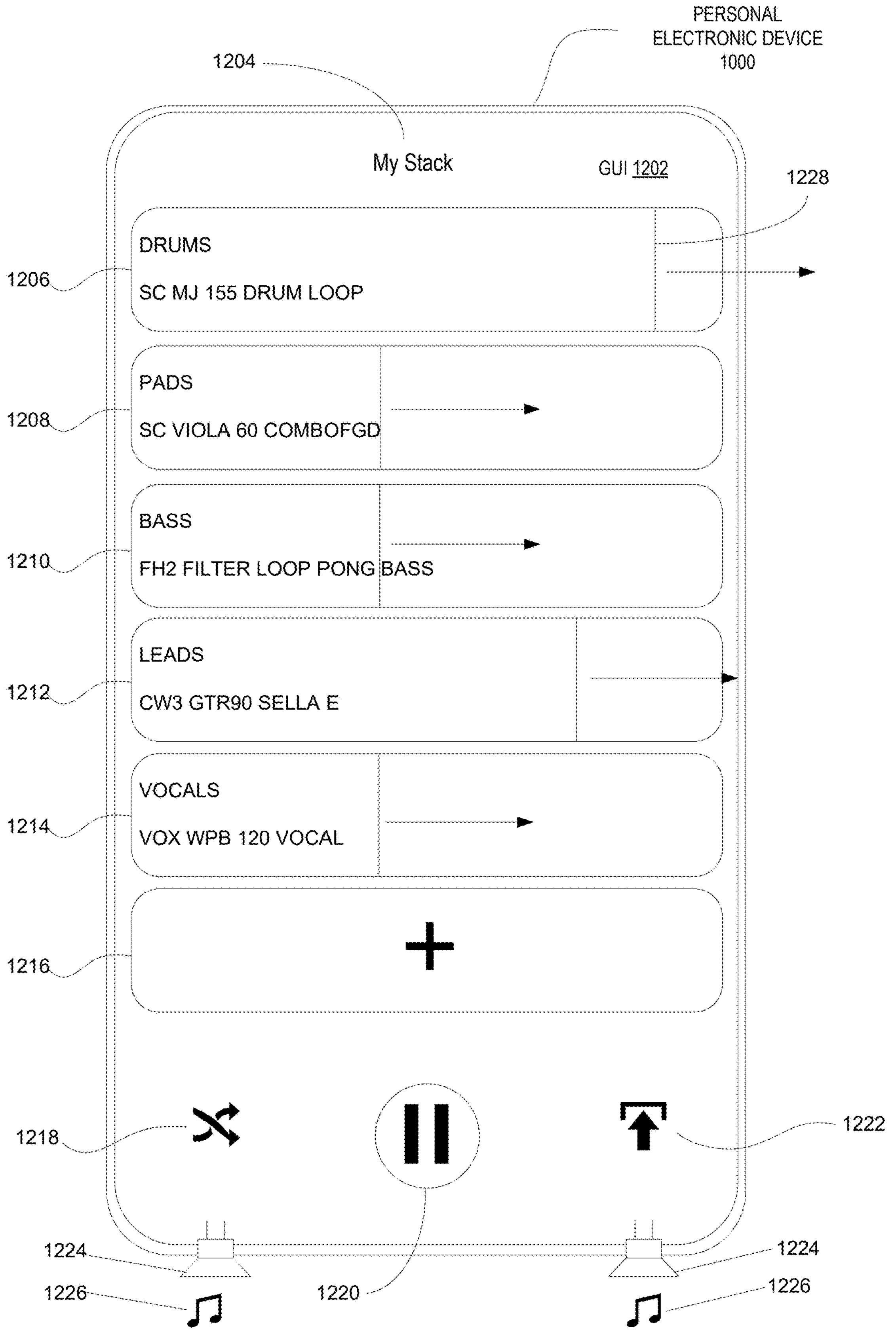
Figure 13:
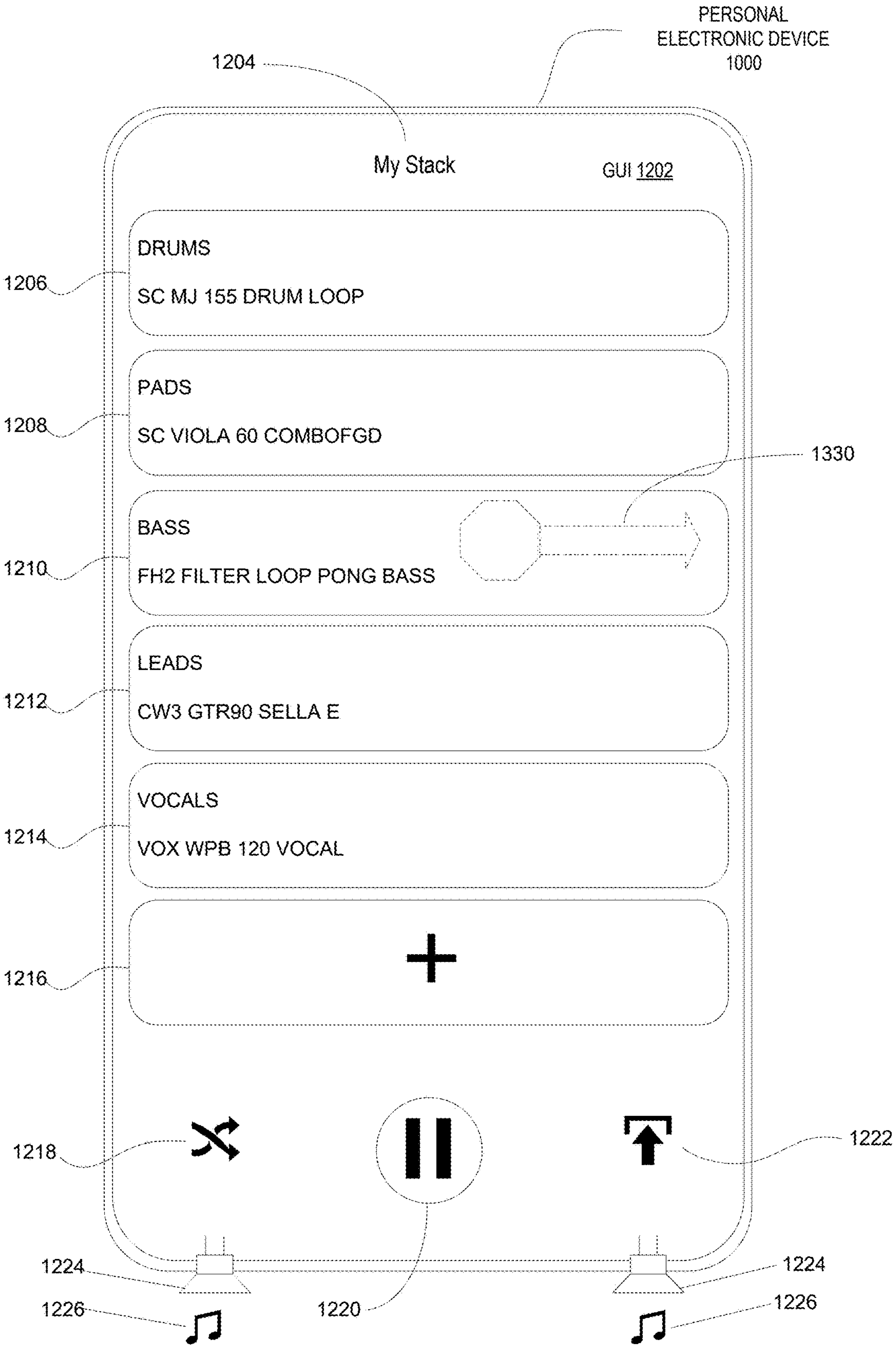

FIG. 12 depicts personal electronic device 1000 with graphical user interface (GUI) 1202 that is displayed in response to the user selecting 1108 the "Acoustic" stack template option as depicted in FIG. 11. GUI 1202 includes text banner 1204 which provides an initial name for the stack being created. In this example, the initial name is "My Stack" which may be changed by the user. For example, selecting text banner 1204 (e.g., by a touch gesture or other user input) may provide the user graphical user interface controls (e.g., text input box controls) in GUI 1202 to change the initial name to something the user desires. Also in GUI 1202, GUI elements 1206, 1208, 1210, 1212, and 1214 represent the music clips in the current stack. Each GUI element 1206, 1208, 1210, 1212, and 1214 representing a music clip indicates the type/genre/style of the music clips (e.g., "Drums", "Pads", "Bass", "Leads", "Vocals", etc.) and the name of the music clips (e.g., "SC VIOLA 60 COMBOFGD"). In this example, the music clips depicted are automatically selected by service 100 for inclusion in the selected stack template according to techniques disclosed herein. As a result, the "Pads," "Bass," "Leads," and "Vocals" music clips corresponding to GUI elements 1208, 1210, 1212, and 1214 form a harmonically compatible partial mix to go with the "Drums" music clip represented by GUI element 1206. GUI 1202 also includes GUI controls 1216 for requesting to add a new compatible music clip to the current stack. GUI controls 1218 are for selecting a new set of music clips to populate the currently selected stack template. Upon selecting controls 1218, the current set of music clips corresponding to GUI element 1206, 1208, 1210, 1212, and 1214 would be discarded and a new set of compatible music clips automatically selected to populate the selected stack template. GUI controls 1220 control whether the current stack is audibly played back as a mix through speakers 1224 of device 1000. Music notes 1226 represent the sound of the current stack as output from speakers 1224 of device 1000. GUI controls 1222 are for sharing the current stack. In some variations, if GUI controls 1220 are set to playback the current stack, then the current stack including each of the constituent music clips is played back on a loop so that the user can hear how the current stack sounds as a mix. A constituent music clip may be time shifted or pitch shifted as necessary by device 1000 or service 100 to match or be synchronized with the other constituent music clips. Each of the GUI elements 1206, 1208, 1210, 1212, and 1214 may include a playback progress indicator (e.g., 1228) that indicates where in the respective music clip playback is currently at. For example, playback indicator 1228 may move from left to right as the current stack is played back on a loop and when one playback of the music clip represented by GUI element 1206 has completed, playback of the music clip may start again from the beginning of the music clip in which case indicator 1228 would start again from the left edge of GUI element 1206 and move (animate) toward the right edge of GUI element 1206 as playback proceeds. In FIG. 13 and following figures, the playback indicators are not depicted for the purpose of providing clear examples and to avoid unnecessarily obscuring other aspects of the disclosed techniques. Thus, the omission of playback indicators from the other figures is not intended to mean that playback indicators are incompatible with the techniques depicted by those other figures.

FIG. 13 depicts personal electronic device 1000 with GUI 1202. Here, the user is selecting 1330 a music clip of the current stack to replace. Selection 1330 may be made by appropriate user input such as, for example, a swipe right touch gesture directed to a touch sensitive surface of device 1000. In this example, the user is selecting 1330 to replace the music clip represented by GUI element 1210 with a compatible "Bass" music clip.

Figure 14:
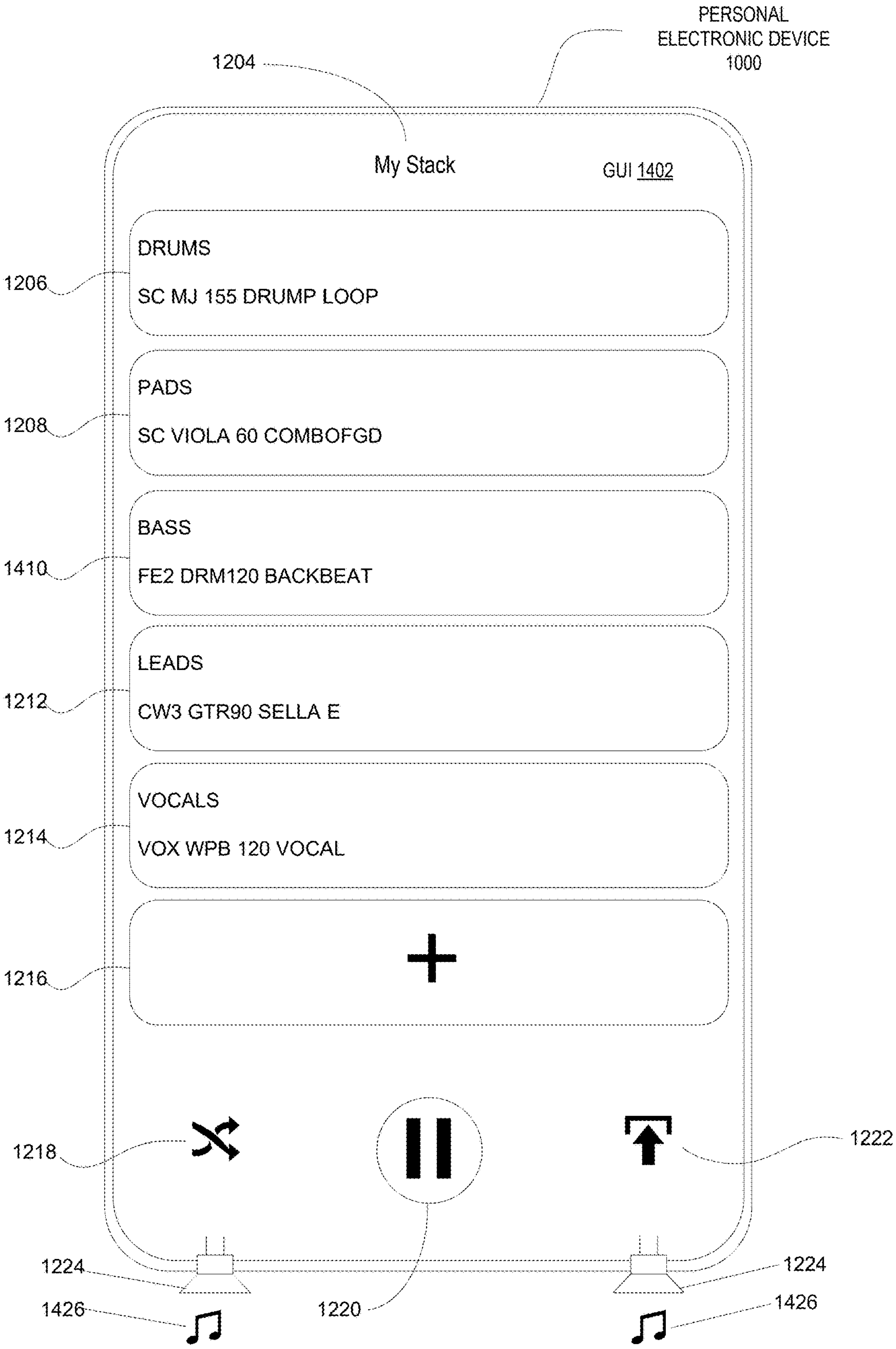

FIG. 14 depicts personal electronic device 1000 with GUI 1402 in response to the user selecting 1330 to replace the current "Bass" music clip of the current stack. As a result of selection 1330, the "FH2 FILTER LOOP PONG BASS" music clip has been replaced by the "FE2 DRM120 BACKBEAT" music clip which has been determined to be harmonically compatible with the partial mix consisting of the music clips represented by GUI elements 1208, 1212, and 1214 (recall that unpitched music clips are not included in the harmonic compatibility determination). Thus, a new partial mix is formed consisting of the music clips represented by GUI elements 1208, 1410, 1212, and 1214. Also, because of selection 1330, the new current stack plays back in a loop mix as indicated by sound 1426 output by speakers 1224. This way, the user can aurally perceive how the new current stack sounds as a mix with the new "Bass" music clip.

Figure 15:
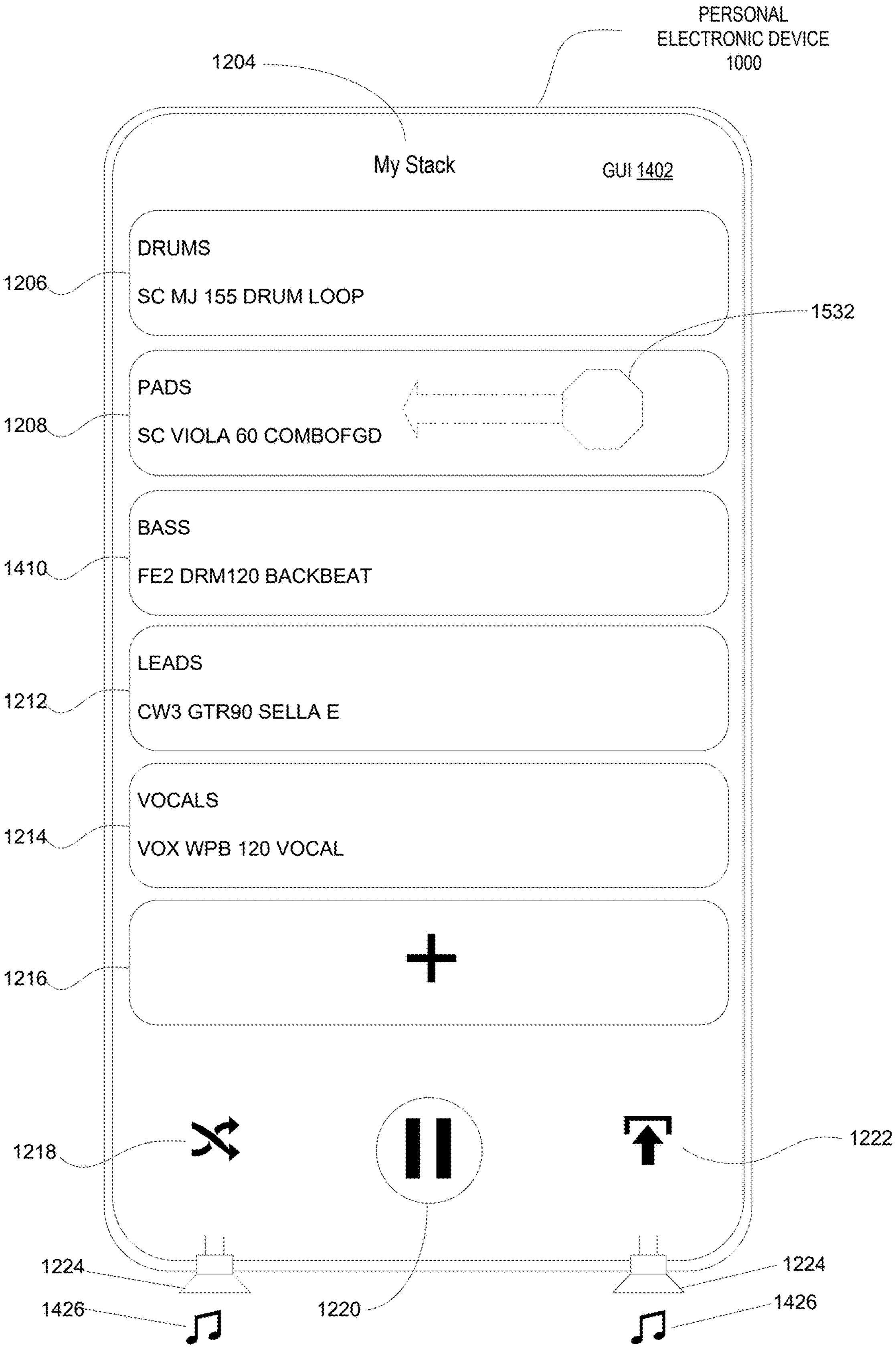

FIG. 15 depicts personal electronic device 1000 with GUI 1402 as depicted in FIG. 14. Here, the user is selecting 1532 a music clip of the current stack to remove. Selection 1532 may be made by appropriate user input such as, for example, a swipe left touch gesture directed to a touch sensitive surface of device 1000. In this example, the user is selecting 1532 to remove the "Pads" music clip represented by GUI element 1208.

Figure 16:
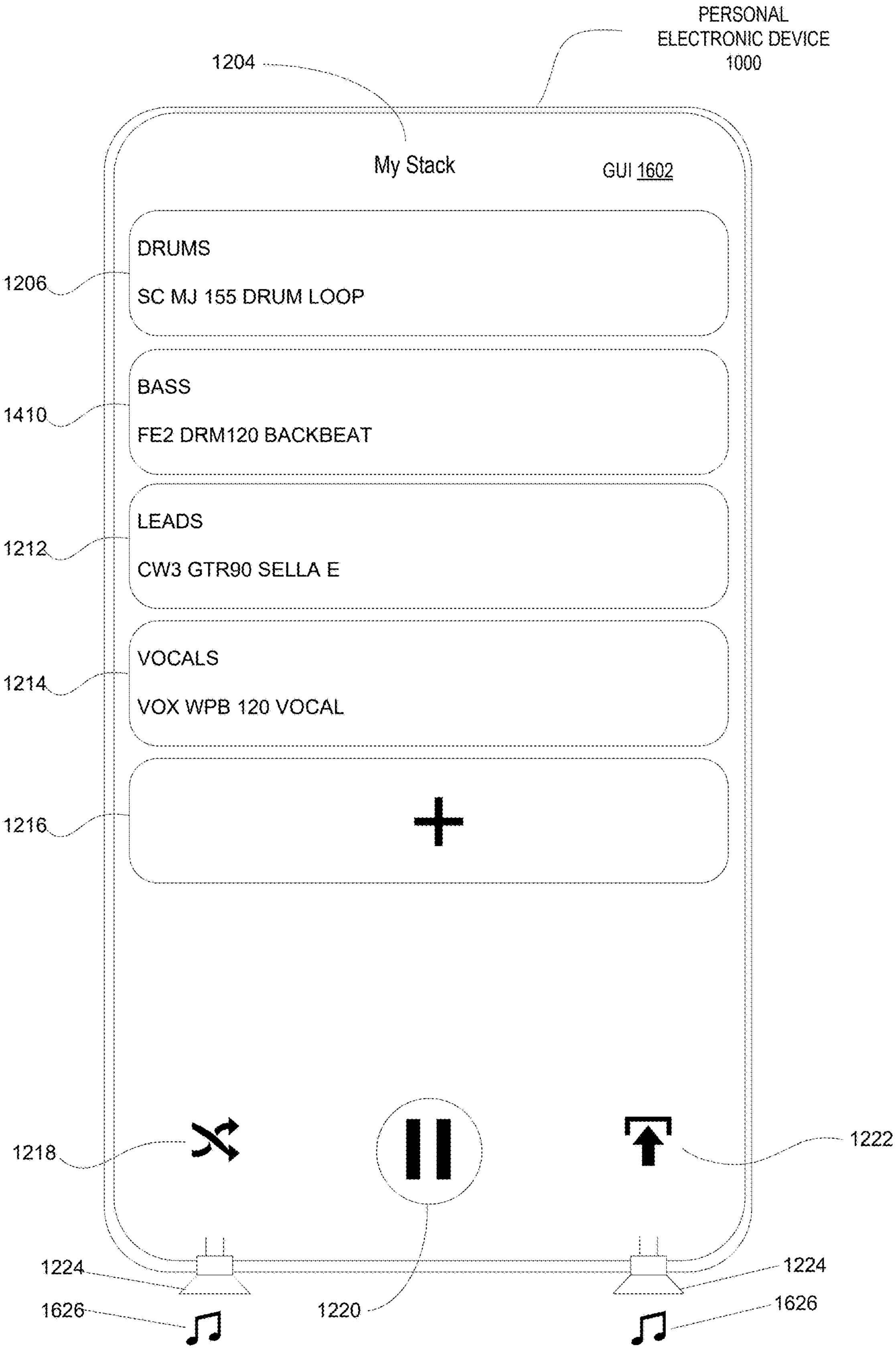

FIG. 16 depicts personal electronic device 1000 with GUI 1602 in response to the user selecting 1532 to remove the "Pads" music clip from the current stack. As a result of the selection 1532, the "Pads" music clip is no longer part of the current stack. The sound 1626 output from speaker 1224 reflects playback of the current stack without the removed "Pads" music clip such that the user can aurally perceive how the new current stack sounds as a mix without the removed "Pads" music clip.

Figure 17:
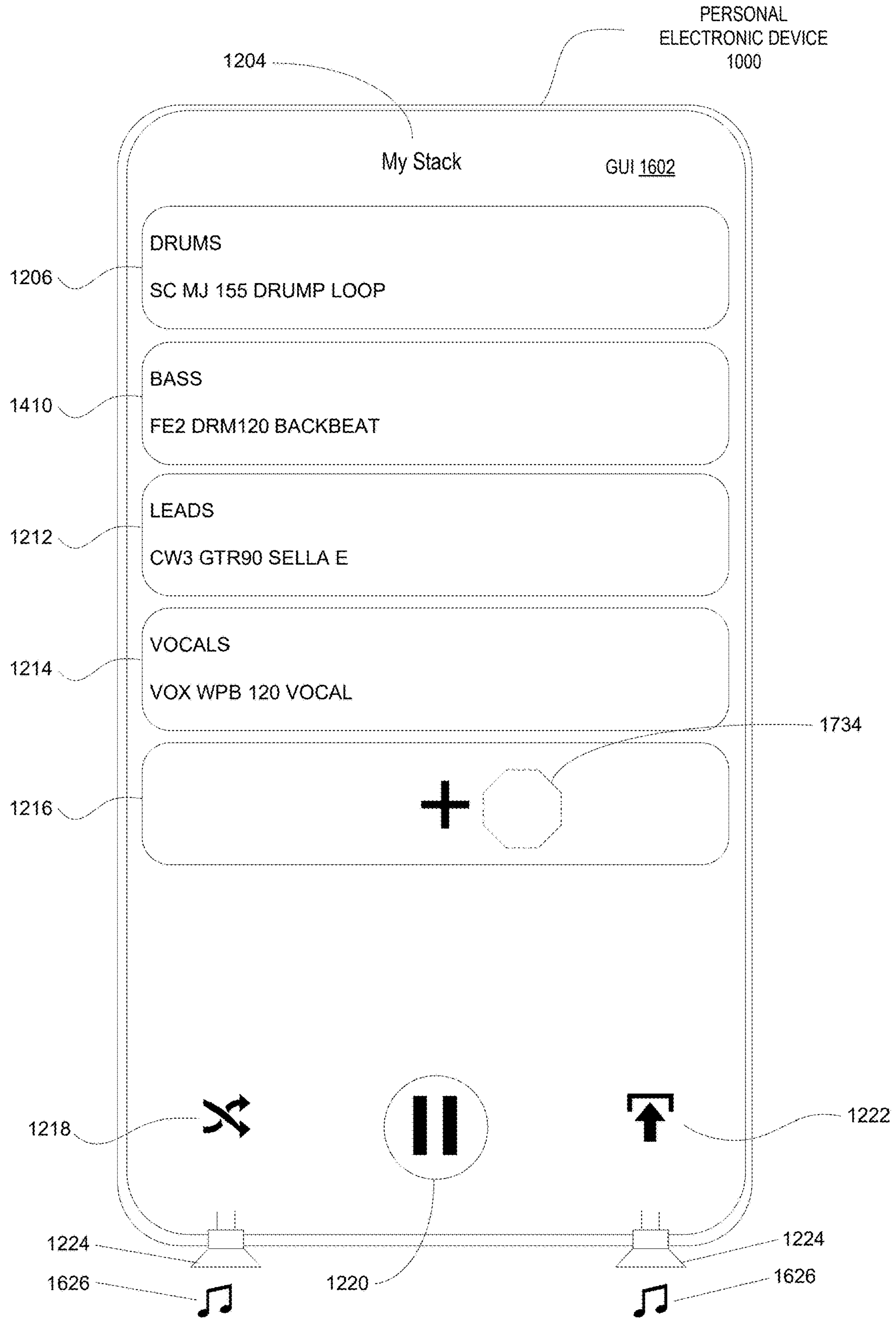

FIG. 17 depicts personal electronic device 1000 with GUI 1602 as depicted in FIG. 16. Here, the user is selecting 1734 to add a new music clip to the current stack. Selection 1734 is made by directing appropriate user input to GUI controls 1216. For example, selecting 1734 may be made by a press touch gesture or the like directed to a touch sensitive surface of device 1000.

Figure 18:
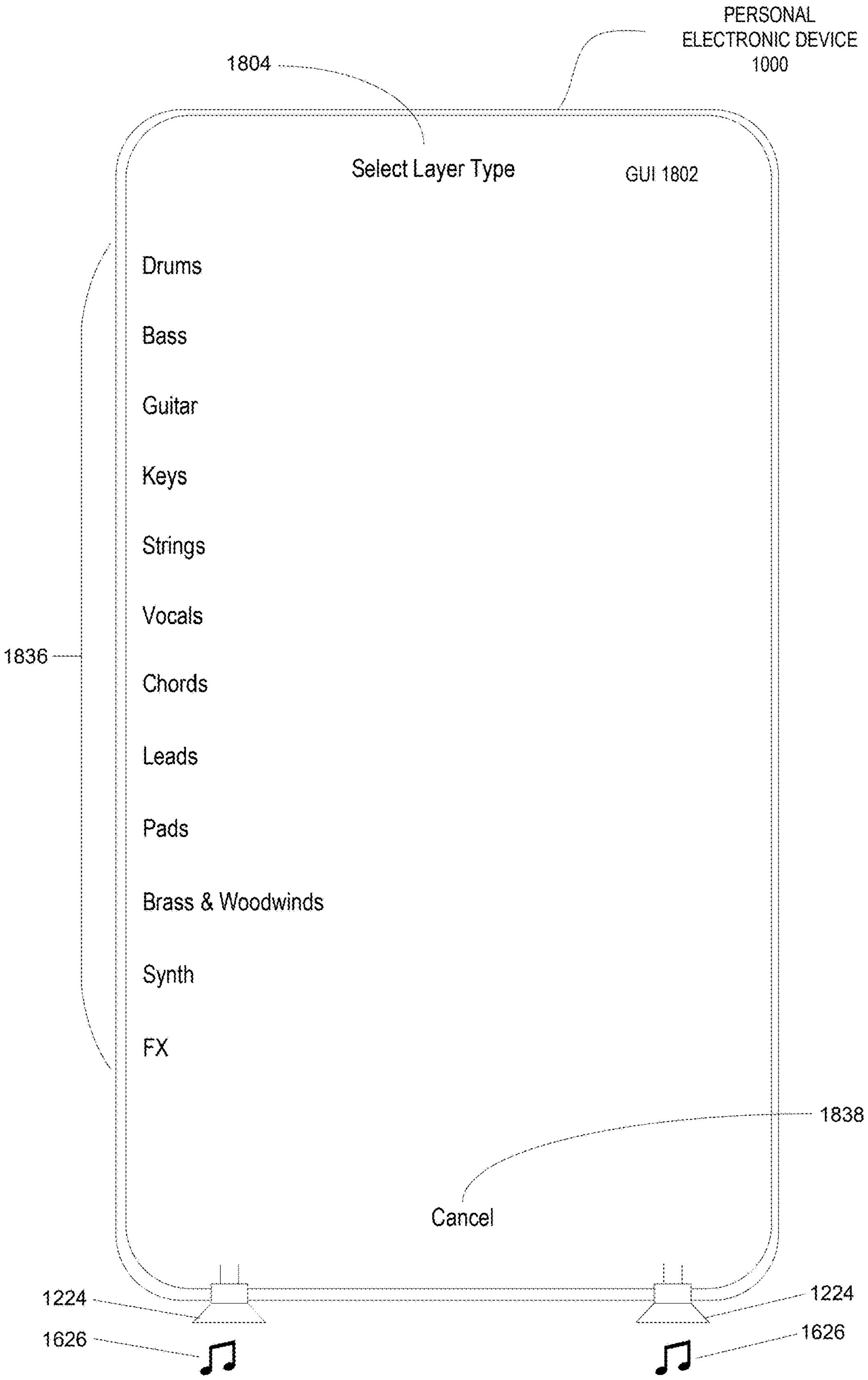
FIG. 18, FIG. 19, FIG. 20, FIG. 21, FIG. 22 depict various states of a graphical user interface of a stack-based music mixing application, according to some variations.

FIG. 18 depicts personal electronic device 1000 with GUI 1802 in response to the user selecting 1734 to add a new layer to the current stack. The current stack continues to play on a loop as indicated by sound 1626. GUI 1802 includes text banner 1804 that prompts the user to select the layer type for the new clip to be added. GUI 1802 provides a set of layer types 1836 as selectable options. GUI 1802 also provides a cancel option 1838 to allow the user to back out of the current operation and return to a GUI state corresponding to GUI 1602. As mentioned above, the stacks-based mixing application may support other ways to add a music clip to a current stack, other than by selecting a layer type. For example, GUI 1802 could offer graphical user interface controls for selecting a music clip from library 108 (e.g., by searching or browsing library 108) to add to the current stack, for uploading a music clip to service 100 and to add to the current stack, or for recording a music clip via microphone capability of device 1000 to add to the current stack. In these cases, the selected, uploaded, or recorded music clip may be added to the current stack regardless of the added music clip's harmonic compatibility with the music clip(s) of the current stack. However, the harmonic compatibility of the added music clip may be considered when selecting subsequent tracks to include in the current stack.

Figure 19:
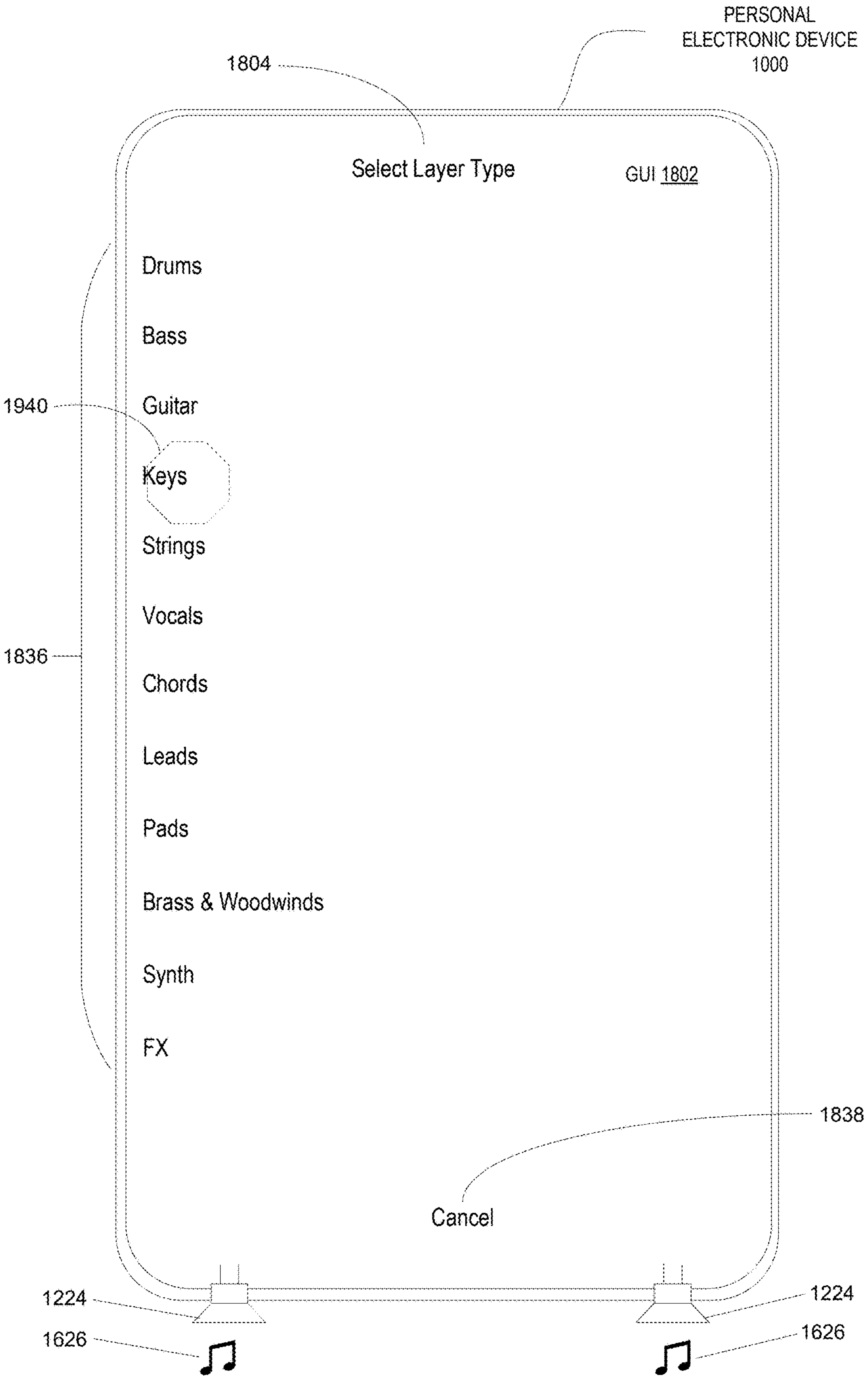

FIG. 19 depicts personal electronic device 1000 with GUI 1802 as depicted in FIG. 18. Here, the user is selecting 1940 a "Keys" layer type for the new music clip to be added to the current stack. The current stack continues to play as a mix on a loop as indicated by sound 1626.

Figure 20:
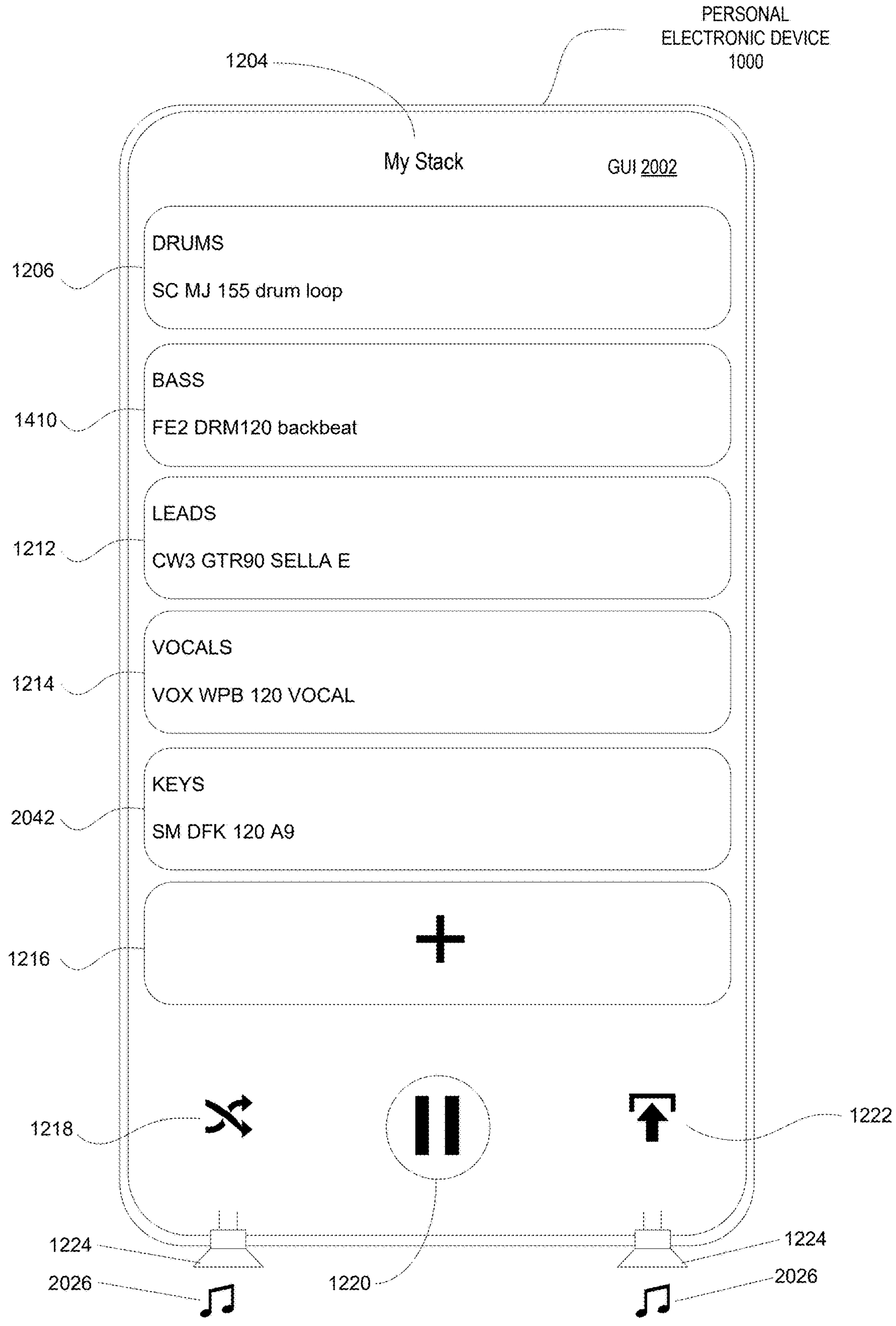

FIG. 20 depicts personal electronic device 1000 with GUI 2002 in response to selecting 1940 the "Keys" layer type. As a result, a new "Keys" music clip is added to the current stack as represented by GUI element 2042. The new "Keys" music clip is determined to be harmonically compatible with the current partial mix consisting of the "Bass" music clip represented by GUI element 1410, the "Leads" music clip represented by GUI element 1212, and the "Vocals" music clip representing by GUI element 1214 to form a new partial mix consisting of the "Bass" music clip, the "Leads" music clip, the "Vocals" music clip, and the "Keys" music clip and a new current stack consisting of the new partial mix and the "Drums" music clip. Sound 2026 reflecting the new current stack is now output from speakers 1224 so that the user can hear how the new current stack sounds as a mix with the new "Keys" music clip.

Figure 21:
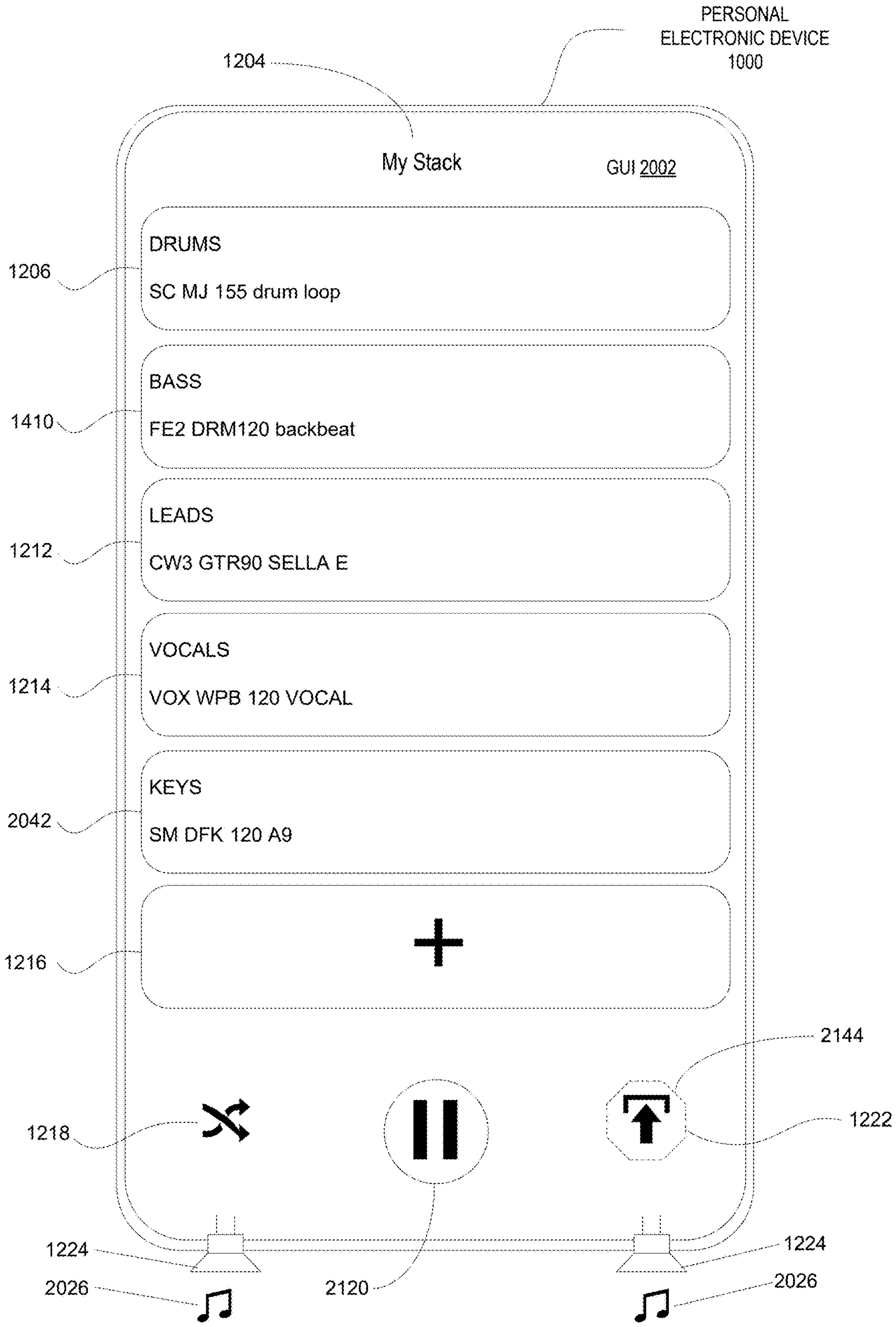

FIG. 21 depicts personal electronic device 1000 with GUI 2002 as depicted in FIG. 20. Here, the user is selecting 2144 to share the current stack as a complete mix. For example, selection 2144 may be made by an appropriate touch gesture (e.g., a press touch gesture) directed to a touch sensitive surface of device 1000.

Figure 22:
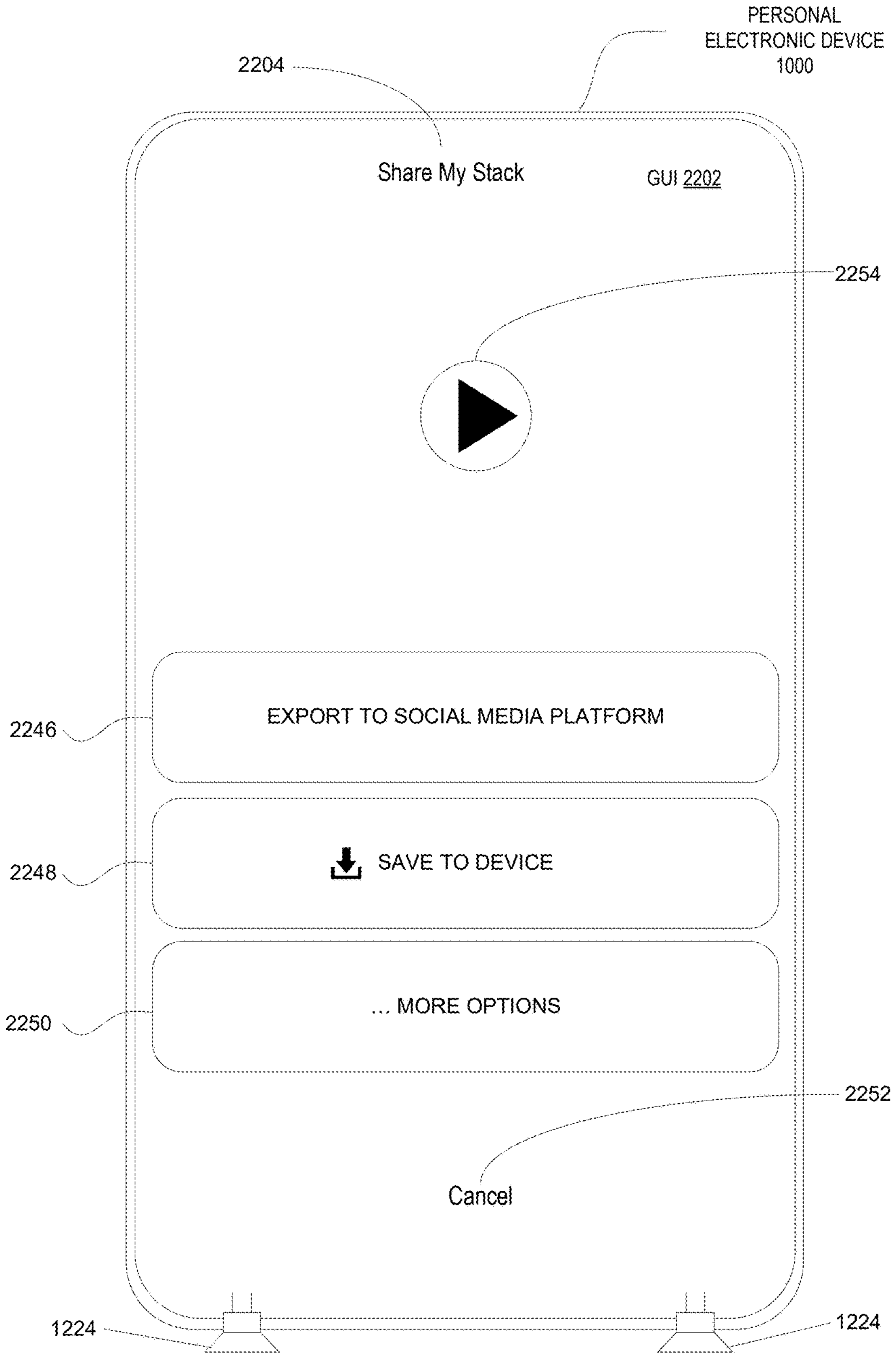

FIG. 22 depicts personal electronic device 1000 with GUI 2202 in response to selection 2144 as depicted in FIG. 21. GUI 2202 includes text banner 2204 that prompts the user how they want to share the stack. As a result of selection 2144, playback of the current stack as a mix is stopped. GUI controls 2254 may be used to resume playback of the current stack from speakers 1224. GUI 2202 provides GUI controls 2246 for exporting the current stack/mix as a music clip to a social media platform (e.g., the aforementioned TIKTOK platform). GUI controls 2248 provides the option to save or export the current stack/mix as a music clip to device 1000 (e.g., stored in a filesystem file, database, or shared memory segment). GUI controls 2250 provide more sharing options such as sharing the current stack/mix as a music clip as an attachment to an email message or as an attachment to a text (SMS) message or uploading the current stack/mix as a music clip to a cloud-based data storage service or a centrally hosted network file system. GUI 2202 also provides cancel GUI controls 2252 to cancel the sharing operation and allow the user to return to a GUI state corresponding to GUI 2002.

In some variations, GUI 2202 provides a user option to export the stack to a digital audio workstation (DAW) so that the user can continue the music creation process. For example, GUI 2202 may provide the option to export the generated stack for importation into a music production software such as, for example, ABLETON LIVE, PRO TOOLS, CUBASE, etc. From there, the user might use the generated stack as a section in a new song composed by the user using the music production software.

In some embodiments, a system that implements a portion or all the techniques described herein can include a general-purpose computer system, such as the computer system 2300 illustrated in FIG. 23, that includes, or is configured to access, one or more computer-accessible media. In the illustrated embodiment, the computer system 2300 includes one or more processors 2310 coupled to a system memory 2320 via an input/output (I/O) interface 2330. The computer system 2300 further includes a network interface 2340 coupled to the I/O interface 2330. While FIG. 23 shows the computer system 2300 as a single computing device, in various embodiments the computer system 2300 can include one computing device or any number of computing devices configured to work together as a single computer system 2300.

In various embodiments, the computer system 2300 can be a uniprocessor system including one processor 2310, or a multiprocessor system including several processors 2310 (e.g., two, four, eight, or another suitable number). The processor(s) 2310 can be any suitable processor(s) capable of executing instructions. For example, in various embodiments, the processor(s) 2310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 2310 can commonly, but not necessarily, implement the same ISA.

The system memory 2320 can store instructions and data accessible by the processor(s) 2310. In various embodiments, the system memory 2320 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 2320 as service code 2325 (e.g., executable to implement, in whole or in part, service 100) and data 2326.

In some embodiments, the I/O interface 2330 can be configured to coordinate I/O traffic between the processor 2310, the system memory 2320, and any peripheral devices in the device, including the network interface 2340 and/or other peripheral interfaces (not shown). In some embodiments, the I/O interface 2330 can perform any necessary protocol, timing, or other data transformations to convert data signals from one component (e.g., the system memory 2320) into a format suitable for use by another component (e.g., the processor 2310). In some embodiments, the I/O interface 2330 can include support for devices attached through various types of peripheral buses, such as a variant of the Peripheral Component Interconnect (PCI) bus standard or the Universal Serial Bus (USB) standard, for example. In some embodiments, the function of the I/O interface 2330 can be split into two or more separate components, such as a north bridge and a south bridge, for example. Also, in some embodiments, some or all of the functionality of the I/O interface 2330, such as an interface to the system memory 2320, can be incorporated directly into the processor 2310.

The network interface 2340 can be configured to allow data to be exchanged between the computer system 2300 and other devices 2360 attached to a network or networks 2350, such as other computer systems or devices as illustrated in FIG. 1, for example. In various embodiments, the network interface 2340 can support communication via any suitable wired or wireless general data networks, such as types of Ethernet network, for example. Additionally, the network interface 2340 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 2300 includes one or more offload cards 2370A or 2370B (including one or more processors 2375, and possibly including the one or more network interfaces 2340) that are connected using the I/O interface 2330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 2300 can act as a host electronic device (e.g., operating as part of a hardware virtualization service) that hosts compute resources such as compute instances, and the one or more offload cards 2370A or 2370B execute a virtualization manager that can manage compute instances that execute on the host electronic device. As an example, in some embodiments the offload card(s) 2370A or 2370B can perform compute instance management operations, such as pausing and/or un-pausing compute instances, launching and/or terminating compute instances, performing memory transfer/copying operations, etc. These management operations can, in some embodiments, be performed by the offload card(s) 2370A or 2370B in coordination with a hypervisor (e.g., upon a request from a hypervisor) that is executed by the other processors 2310A-2310N of the computer system 2300. However, in some embodiments the virtualization manager implemented by the offload card(s) 2370A or 2370B can accommodate requests from other entities (e.g., from compute instances themselves), and cannot coordinate with (or service) any separate hypervisor.

In some embodiments, the system memory 2320 can be one embodiment of a computer-accessible medium configured to store program instructions and data as described above. However, in other embodiments, program instructions and/or data can be received, sent, or stored upon different types of computer-accessible media. A computer-accessible medium can include any non-transitory storage media or memory media such as magnetic or optical media, e.g., disk or DVD/CD coupled to the computer system 2300 via the I/O interface 2330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 2300 as the system memory 2320 or another type of memory. Further, a computer-accessible medium can include transmission media or signals such as electrical, electromagnetic, or digital signals, conveyed via a communication medium such as a network and/or a wireless link, such as can be implemented via the network interface 2340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP/S servers, File Transfer Protocol (FTP) servers, Common Gateway Interface (CGI) servers, data servers, Java servers, business application servers, etc. The server(s) also can be capable of executing programs or scripts in response to requests from user devices, such as by executing one or more Web applications that can be implemented as one or more scripts or programs written in any programming language, such as Java®, C, C #or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternative embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth to provide a thorough understanding of the embodiments. However, it will also be apparent to one skilled in the art that the embodiments can be practiced without the specific details. Furthermore, well-known features can be omitted or simplified in order not to obscure the embodiment being described.

In the foregoing description and in the appended claims, reference may be made to a column (e.g., a column of a matrix) or an x-axis (e.g., an x-axis of a plot) and reference may be made to a row (e.g., as in a row of a matrix) or a y-axis (e.g., a y-axis of a plot). Unless the context clearly indicates otherwise, a reference in the foregoing description or in the appended claims to a column may be substituted with a row and vice versa and a reference to an x-axis may be substituted with a y-axis and vice versa without loss of generality.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, or that blocks with solid borders are not optional in certain embodiments.

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

What is claimed is:

1. A method comprising:

receiving a request for a music clip that is harmonically compatible with an indicated set of one or more music clips;

identifying a particular music clip that is harmonically compatible over a predetermined number of musical beats with the indicated set of music clips based on a first pitch interval space representation of the indicated set of music clips and a second pitch interval space representation of the particular music clip;

computing the second pitch interval space representation of the particular music clip based on: computing a set of beat-wise pitch interval space representations for the predetermined number of musical beats based on a chromatic saliency map for the particular music clip, and forming the second pitch interval space representation based on the set of beat-wise pitch interval space representations;

providing a response to the request, the response indicating the particular music clip that is identified as harmonically compatible over the predetermined number of musical beats with the indicated set of music clips based on the first pitch interval space representation of the indicated set of music clips and the second pitch interval space representation of the particular music clip; and wherein the method is performed by one or more computer systems.

2. The method of claim 1, wherein:

the indicated set of one or more music clips comprises a plurality of music clips;

each music clip of the plurality of music clips is represented by a respective pitch interval space representation; and the method further comprises generating the first pitch interval space representation of the indicated set of music clips over the predetermined number of musical beats based on the respective pitch interval space representation for each music clip of the plurality of music clips.

3. The method of claim 1, further comprising:

including the particular music clip in a current stack of music clips comprising the indicated set of music clips.

4. The method of claim 1, further comprising:

identifying the particular music clip as harmonically compatible over the predetermined number of musical beats with the indicated set of music clips based on a distance or a similarity in a pitch interval space between the first pitch interval space representation and the second pitch interval space representation.

5. The method of claim 1, wherein each of the first pitch interval space representation and the second pitch interval space representation is beats-per-minute agnostic.

6. The method of claim 1, further comprising:

causing a graphical user interface to be presented that indicates that the particular music clip is harmonically compatible with the indicated set of music clips.

7. The method of claim 1, wherein the request comprises the first pitch interval space representation of the indicated set of music clips.

8. The method of claim 1, wherein the response comprises an identifier of the particular music clip.

9. The method of claim 1, wherein the predetermined number of beats is two, four, eight, sixteen, thirty-two, or sixty four.

10. One or more non-transitory computer-readable media storing instructions configured for:

receiving a request for a music clip that is harmonically compatible with an indicated set of one or more music clips;

identifying a particular music clip that is harmonically compatible over a predetermined number of musical beats with the indicated set of music clips based on a first pitch interval space representation of the indicated set of music clips and a second pitch interval space representation of the particular music clip;

computing the second pitch interval space representation of the particular music clip based on:

computing a set of beat-wise pitch interval space representations for the predetermined number of musical beats based on a chromatic saliency map for the particular music clip, and forming the second pitch interval space representation based on the set of beat-wise pitch interval space representations; and providing a response to the request, the response indicating the particular music clip that is identified as harmonically compatible over the predetermined number of musical beats with the indicated set of music clips based on the first pitch interval space representation of the indicated set of music clips and the second pitch interval space representation of the particular music clip.

11. The one or more non-transitory computer-readable media of claim 10, the instructions further configured for:

including the particular music clip in a current stack of music clips comprising the indicated set of music clips.

12. The one or more non-transitory computer-readable media of claim 10, the instructions further configured for:

identifying the particular music clip as harmonically compatible over the predetermined number of musical beats with the indicated set of music clips based on a distance or a similarity in a pitch interval space between the first pitch interval space representation and the second pitch interval space representation.

13. The one or more non-transitory computer-readable media of claim 10, the instructions further configured for:

causing a graphical user interface to be presented that indicates that the particular music clip is harmonically compatible with the indicated set of music clips.

14. A system comprising:

one or more computer systems having one or more hardware processors; and instructions configured to cause the one or more computer systems to perform a set of operations comprising:

receiving a request for a music clip that is harmonically compatible with an indicated set of one or more music clips;

identifying a particular music clip that is harmonically compatible over a predetermined number of musical beats with the indicated set of music clips based on a first pitch interval space representation of the indicated set of music clips and a second pitch interval space representation of the particular music clip;

computing the second pitch interval space representation of the particular music clip based on:

computing a set of beat-wise pitch interval space representations for the predetermined number of musical beats based on a chromatic saliency map for the particular music clip; and forming the second pitch interval space representation based on the set of beat-wise pitch interval space representations; and providing a response to the request, the response indicating the particular music clip that is identified as harmonically compatible over the predetermined number of musical beats with the indicated set of music clips based on the first pitch interval space representation of the indicated set of music clips and the second pitch interval space representation of the particular music clip.

15. The system of claim 14, the set of operations further comprising:

including the particular music clip in a current stack of music clips comprising the indicated set of music clips.

16. The system of claim 14, the set of operations further comprising:

identifying the particular music clip as harmonically compatible over the predetermined number of musical beats with the indicated set of music clips based on a distance or a similarity in a pitch interval space between the first pitch interval space representation and the second pitch interval space representation.

17. The system of claim 14, the set of operations further comprising:

causing a graphical user interface to be presented that indicates that the particular music clip is harmonically compatible with the indicated set of music clips.

* * * * *